United States Patent
Sekiya et al.

(10) Patent No.: US 7,394,993 B2
(45) Date of Patent: Jul. 1, 2008

(54) DISPERSION COMPENSATION QUANTITY SETTING METHOD, RECEIVING TERMINAL STATION, AND WAVELENGTH-MULTIPLEXING OPTICAL TRANSMISSION SYSTEM

(75) Inventors: Motoyoshi Sekiya, Kawasaki (JP); Takuya Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 639 days.

(21) Appl. No.: 10/923,855

(22) Filed: Aug. 24, 2004

(65) Prior Publication Data
US 2005/0238362 A1    Oct. 27, 2005

(30) Foreign Application Priority Data
Apr. 21, 2004  (JP) ............... 2004-125987

(51) Int. Cl.
H04J 14/02  (2006.01)
H04B 10/08  (2006.01)
(52) U.S. Cl. ............... 398/201; 398/81; 398/147
(58) Field of Classification Search ............ 398/81, 398/147, 213, 201
See application file for complete search history.

(56) References Cited

U.S. PATENT DOCUMENTS

| | | | |
|---|---|---|---|
| 5,717,510 A | 2/1998 | Ishikawa et al. | 359/161 |
| 6,124,960 A | 9/2000 | Garthe et al. | 359/181 |
| 6,538,788 B2 * | 3/2003 | Franco et al. | 398/158 |
| 6,798,565 B2 * | 9/2004 | Rapp | 359/337 |
| 2003/0002112 A1 * | 1/2003 | Hirano et al. | 359/161 |
| 2004/0197103 A1 * | 10/2004 | Roberts et al. | 398/159 |

FOREIGN PATENT DOCUMENTS

| | | |
|---|---|---|
| JP | HEI 08-321805 | 12/1996 |
| JP | HEI 11-149064 | 6/1999 |
| JP | 2000-183815 | 6/2000 |

OTHER PUBLICATIONS

Wu Et al, Fiber Nonlinearity Limitations in Ultra Dense WDM Systems, journal of Lightwave Technology, vol. 22, No. 6, Jun. 2004.*

* cited by examiner

*Primary Examiner*—Leslie Pascal
(74) *Attorney, Agent, or Firm*—Staas & Halsey LLP

(57) ABSTRACT

In a dispersion compensation quantity setting technique for use in a WDM transmission system, a transmitting terminal node transmits CW light and modulated light obtained by modulation using a modulation pattern signal, while a receiving terminal node detects a physical quantity stemming from cross phase modulation occurring between the transmitting terminal node and the receiving terminal node on the basis of a variation of an intensity of the transmitted CW light and sets a dispersion compensation quantity on the basis of a variation of the detected physical quantity. Moreover, this optimizes the crosstalk, suppresses the output power of transmitted light, eliminates the nonlinear optical effect of the transmitted light, and carries out dispersion compensation superior in cost performance.

15 Claims, 23 Drawing Sheets

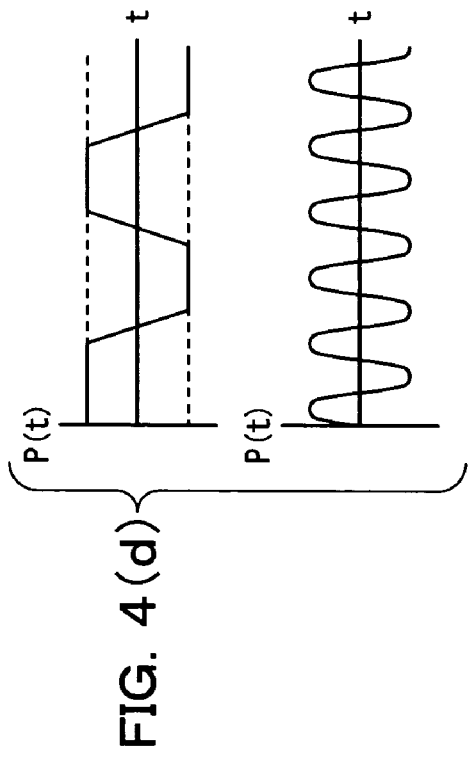
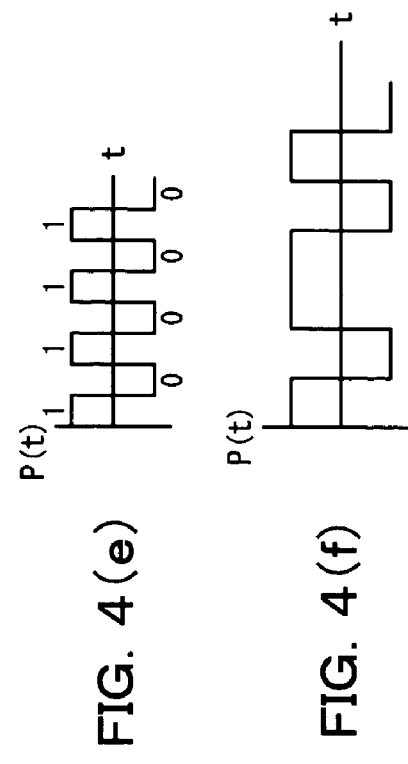
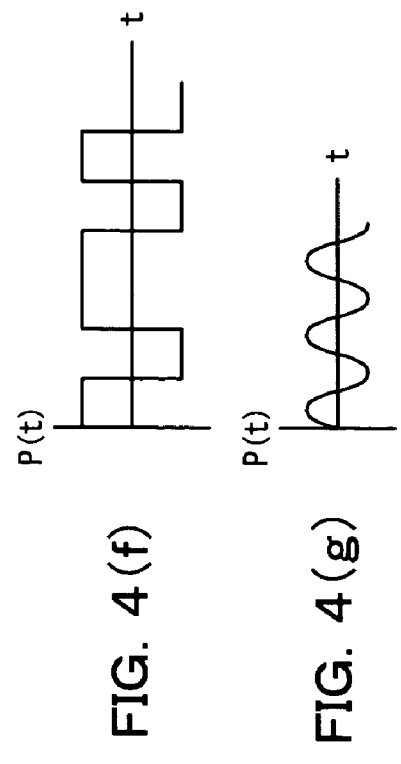
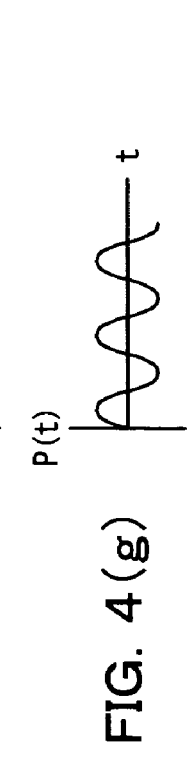
FIG. 4(d)
FIG. 4(e)
FIG. 4(f)
FIG. 4(g)
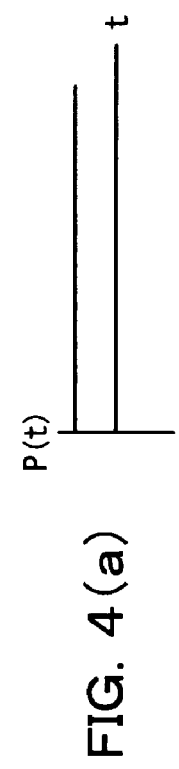
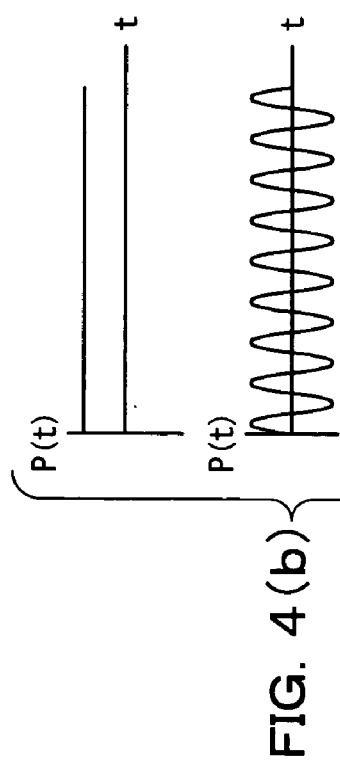
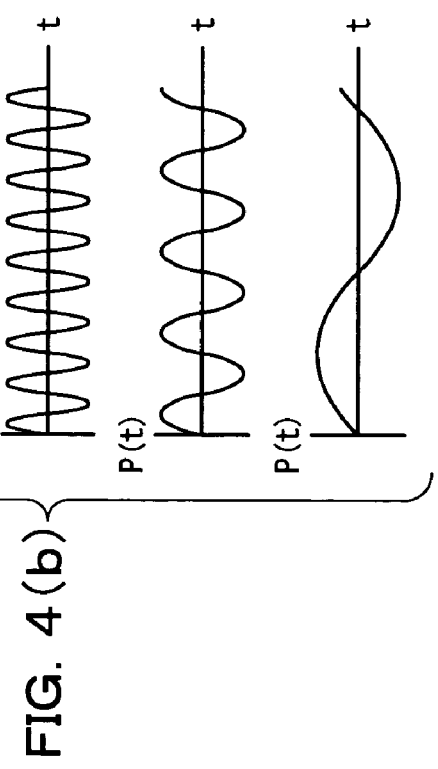
FIG. 4(a)
FIG. 4(b)
FIG. 4(c)

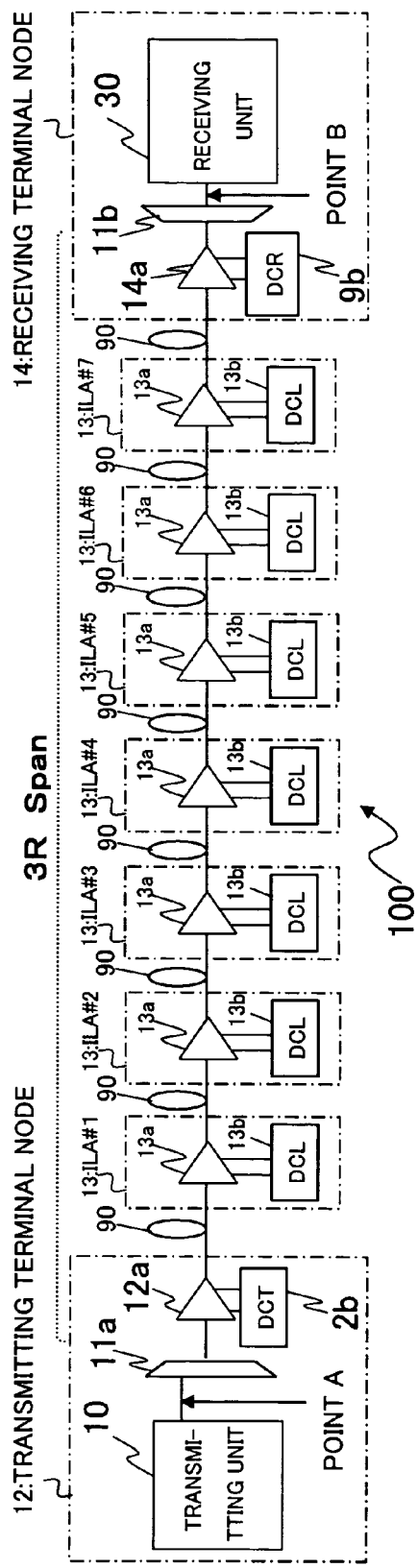
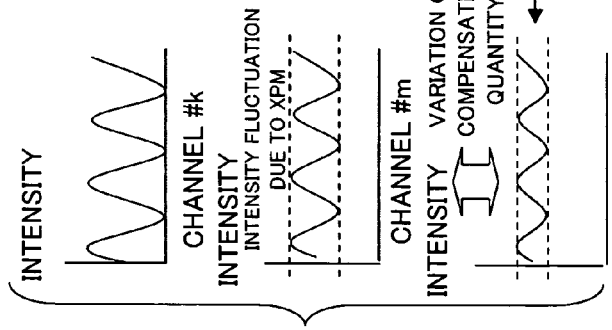
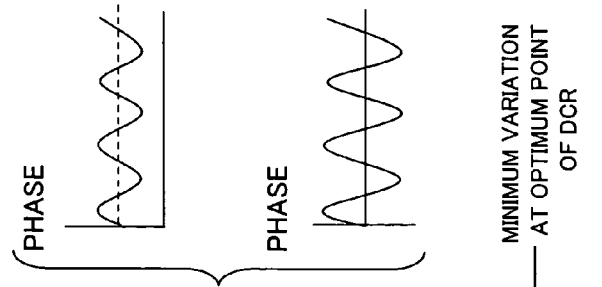
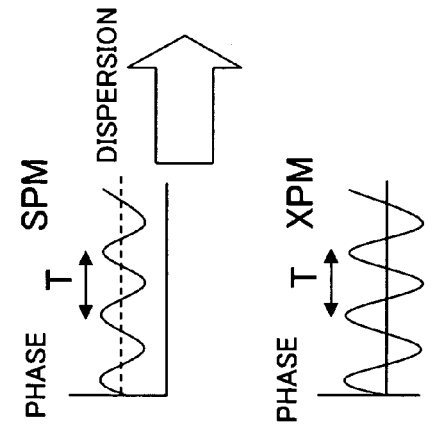
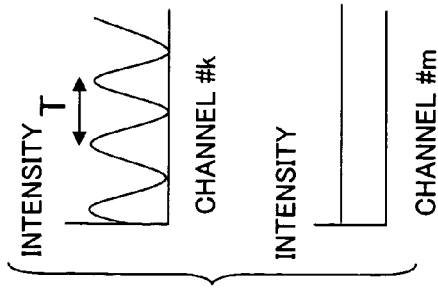

RECEPTION DISPERSION COMPENSATION QUANTITY AND INTENSITY VARIATION WIDTH

TIME-OPTICAL INTENSITY (XPM)

VDC1: VARIABLE DISPERSION COMPENSATOR (DCT1)
VDC2: VARIABLE DISPERSION COMPENSATOR (DCR1)

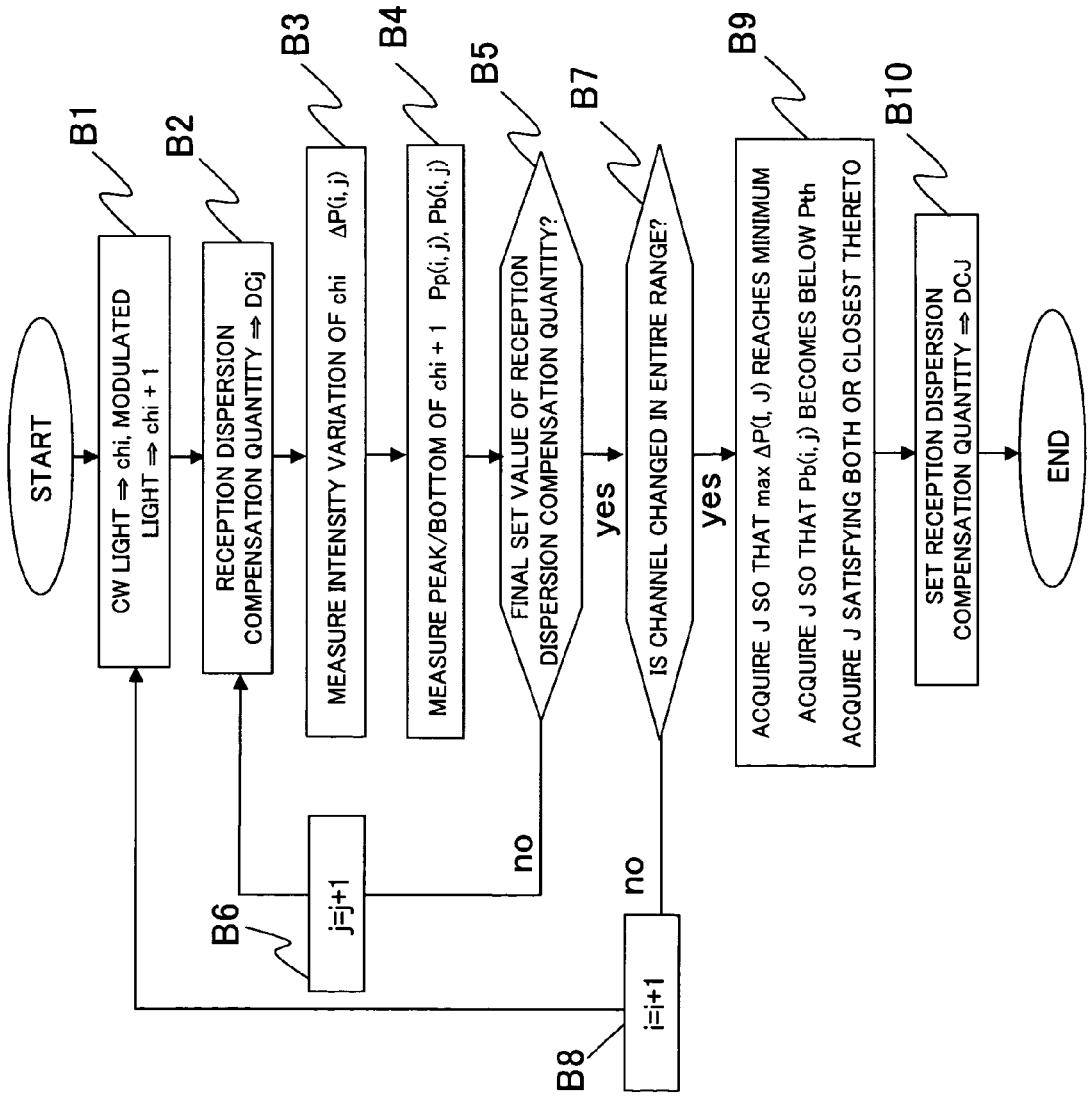

XPM

SPM

DISPERSION COMPENSATION QUANTITY SETTING METHOD, RECEIVING TERMINAL STATION, AND WAVELENGTH-MULTIPLEXING OPTICAL TRANSMISSION SYSTEM

BACKGROUND OF THE INVENTION (1) Field of the Invention

The present invention relates to, for example, in a WDM (Wavelength Division Multiplexing) linear repeating transmission system (which will hereinafter be referred to as a WDM transmission system), a dispersion compensation quantity (value) setting method, receiving terminal station and wavelength-multiplexing optical transmission system, suitable for the compensation for waveform distortions occurring due to nonlinear optical effects and the compensation for chromatic dispersions.

(2) Description of the Related Art

In general, for the transmission of wavelength-multiplexed light, a WDM transmission system (WDM optical communication system) using an optical amplifier is effective in the reduction of circuit cost. In this WDM transmission system, the enhancement of bit rate and the improvement of wavelength density are indispensable to the expansion of transmission capacity.

(i) Expansion of Transmission Capacity

As well known, the methods of expanding the transmission capacity are classified into a method of increasing the number of wavelengths of transmitted light within a specific wavelength band (densification of number of wavelengths) and a method of enlarging a wavelength band to increase the number of wavelengths (enlargement of wavelength band). The densification of number of wavelengths causes the interference among a plurality of transmitted lights close in wavelength to each other and leads to marvelous nonlinear optical effects of an optical fiber. Accordingly, on the other side of the expansion of the transmission capacity, waveform distortions occurs and difficulty is experienced in making long-distance transmissions.

On the other hand, on the enlargement of wavelength band, limitation is imposed due to the amplification characteristics of devices themselves, such as an EDFA (Erbium-Doped Optical Fiber Amplifier). That is, since limitation is imposed on the device amplified wavelength bandwidth, difficulty is encountered in enlarging the wavelength band.

(ii) Long-Distance Transmission

In general, in a WDM transmission system using an optical amplifier, due to the nonlinear optical effects in a transmission line, simultaneous with a waveform degradation stemming from the self phase modulation (which will hereinafter be referred to as a self phase modulation SPM) which is a phase modulation occurring in accordance with an intensity variation of a transmission channel itself, a waveform degradation develops due to the cross phase modulation (which will hereinafter be referred to as a cross phase modulation XPM) which is a phase modulation occurring in accordance with an intensity variation of a channel different in wavelength. Coupled with the dispersion, each phase modulation component is converted into a waveform distortion. For this reason, the optical signal transmission distance becomes longer by suppressing the dispersion and the nonlinear optical effects.

(iii) Dispersion Compensator

For the suppression of the dispersion, a dispersion compensator is provided in an optical fiber transmission line and, in consideration of the non-uniformity of the dispersion quantity, it is provided in the interior of a repeating node (repeater, repeater station, repeating unit or optical amplification repeating unit) or in an optical fiber transmission line. Moreover, the "position and the degree of the compensation" scalled dispersion compensation management, and various examinations have been made on the location and others of the dispersion compensator.

The repeating nodes can be located at an approximately equal interval in a case in which the optical fiber transmission line is laid on the bottom of the sea. On the other hand, in a case in which an optical fiber transmission line is on land, in view of cost, difficulty is experienced in making the interval between the repeating nodes constant, and the dispersion compensation quantity needed for each repeating span (repeating zone) is not always made constant.

(iv) Linear Repeating Transmission System

In the case of carrying out the dispersion compensation in the WDM transmission system, a manager determines a location of a dispersion compensator and a dispersion compensation quantity thereof in consideration of an optical fiber transmission line condition (for example, the dispersion of an optical fiber and the influence of the nonlinear optical effect occurring in an optical fiber transmission line). In general, the location of a dispersion compensator and the dispersion compensation quantity thereof are determined through repeating transmission simulations in accordance with various types of characteristics of a given optical fiber transmission line.

In this connection, as the technique of improving the waveform distortion in an optical transmission system, there are been proposed a method of compensating for the influence of the phase modulation (for example, Patent Document 1).

A transmission system disclosed in this Patent Document 1 is prechirped through the use of an amplitude modulation replica applied to each of other channels or a replica passing through a low-pass filter on a transmitter side for each individual channel in a WDM transmission system which transmits traffic amplitude-modulated to develop significant cross phase modulation XPM. For the compensation for the self phase modulation SPM, for each channel, it is also acceptable to additionally or substitutively employ the prechirp using an amplitude modulation replica applied to that channel. This eliminates at least a portion of the adverse influence of the cross phase modulation XPM and/or the self phase modulation SPM, thus providing a transmission system with a compensation function.

In addition, Patent Document 2 discloses an optical transmission system in which the transmission side is equipped with a dispersion assigning unit to assign chromatic dispersions different from each other to a signal light in an adjacent channel (wavelength) and the reception side is provided with a dispersion compensator to compensate for the chromatic dispersions assigned to the signal light in each channel on the transmission side and for the chromatic dispersion in an optical fiber transmission line. This can suppress the crosstalk from the adjacent channel with effect and achieve the effective utilization of a band by making the wavelength spacing closer.

Patent Document 1: Japanese Patent Laid-Open No. HEI11-149064

Patent Document 2: Japanese Patent Laid-Open No. 2000-183815

However, in the WDM transmission system using an optical amplifier, the transmitted light undergoes the phase modulation due to the self phase modulation SPM and the cross phase modulation XPM. Moreover, for example, if the number of multiplexes is taken as i (i denotes a natural number), the j-th (j represents a natural number smaller than i) wavelength light (channel #j) develops a waveform distortion arising from the synergy of the factors of the self phase modulation SPM stemming from the wavelength light j itself, the cross phase modulation XPM between this self phase modulation SPM and the (i−1) wavelength lights other than the wavelength light j and the dispersions.

Furthermore, various methods of individually carrying out the effective compensation on the self phase modulation SPM and the effective compensation on the cross phase compensation XPM have been known, whereas a method of carrying out both these compensations simultaneously is difficult in design.

Still furthermore, although, for suppressing the occurrence of the crosstalk (XPM between different channels), for example, the location of a dispersion compensator is determined through simulations or the like conducted in advance, the sufficient optimization requires detailed examination with high accuracy and, in a case in which the actual transmission environment differs from the condition assumed at the design, the transmission quality lowers with respect to that at the design.

In addition to this, the realization of the optimization becomes difficult for taking into consideration the differences among the performances of the optical fibers, optical amplifiers and others and, hence, for example, a manager decreases the number of wavelengths or shortens the transmission distance, which can lead to the degradation of the performances.

Meanwhile, the aforesaid Japanese Patent 1 can compensate for the XPM introduced into a first span after a transmitter but it cannot compensate for the XPM occurring due to the nonlinear optical effects in the second and subsequent spans as a result of the light intensity amplified in a relevant amplifier. In addition, difficulty is encountered in setting the dispersion compensation quantity variably.

Moreover, the aforesaid Japanese Patent 2 relates to a technique of reducing the peal intensity by assigning the prechirp to a signal light in each channel, and is for suppressing the influence of the nonlinear optical effects in an optical fiber transmission line. Therefore, it does not provide a mode taking both the self phase modulation SPM and cross phase modulation XPM into consideration.

SUMMARY OF THE INVENTION

The present invention has been developed in consideration of these problems, and it is therefore an object of the invention to provide a dispersion compensation quantity setting method, receiving terminal station and wavelength-multiplexing optical transmission system, capable of compensating effectively for dispersion quantity, improving the transmission quality and reliability, separately evaluating waveform distortions stemming from the self phase modulation SPM and a cross phase modulation XPM, coupled with promoting the reduction of parts cost and reducing the efforts for examination on the number of wavelengths, distance and others needed for maintaining the transmission capability or performance.

For this purpose, in accordance with an aspect of the present invention, there is provided a dispersion compensation quantity (value) setting method for use in a wavelength-multiplexing optical transmission system including a transmitting terminal station and a receiving terminal station and made to transmit wavelength-multiplexed light, the method comprising a transmission step in which the transmitting terminal station transmits continuous-wave light and modulated light obtained by modulating with a modulation pattern signal and having a wavelength different from a wavelength of the continuous-wave light, a detection step in which the receiving terminal station detects a physical quantity arising from a cross phase modulation between the transmitting terminal station and the receiving terminal station on the basis of a variation in intensity of the continuous-wave light transmitted in the transmission step, and a dispersion compensation quantity setting step in which the receiving terminal station sets a reception dispersion compensation quantity (value) on the basis of a variation of the physical quantity detected in the detection step.

Therefore, this can set the reception dispersion compensation quantity so as to reduce the influence of the cross phase modulation XPM and, hence, the effective dispersion quantity compensation becomes feasible in a manner such that a variable dispersion compensator is provided in the reception terminal station.

In addition, in accordance with another aspect of the present invention, there is provided a dispersion compensation quantity setting method for use in a wavelength-multiplexing optical transmission system including a transmitting terminal station and a receiving terminal station and made to transmit wavelength-multiplexed light, the method comprising a transmission step in which the transmitting terminal station transmits constant-intensity light and intensity-modulated light having a wavelength different from a wavelength of the constant-intensity light, a detection step in which the receiving terminal station detects a physical quantity arising from an amplitude variation of the constant-intensity light transmitted in the transmission step, and a dispersion quantity setting step in which the receiving terminal station sets a reception dispersion compensation quantity on the basis of the physical quantity detected in the detection step.

This enables setting the dispersion compensation quantity according to the direct evaluation of an occurrence quantity of the cross phase modulation XPM, which realizes an optimum dispersion compensating configuration so that the effects of the cross phase modulation XPM are avoidable.

Still additionally, in accordance with a further aspect of the present invention, there is provided a receiving terminal station for use in a wavelength-multiplexing optical transmission system including a transmitting terminal station and a receiving terminal station and made to transmit wavelength-multiplexed light, the receiving terminal station comprising a receiving unit for receiving constant-intensity light and intensity-modulated light having a wavelength different from a wavelength of the constant-intensity light, transmitted from the transmitting terminal station, a detecting unit for detecting a physical quantity arising from an amplitude variation of the constant-intensity light of the constant-intensity light and the intensity-modulated light received in the receiving unit, and a dispersion compensation quantity setting unit for setting a reception dispersion compensation quantity on the basis of the physical quantity detected in the detecting unit.

Thus, the troublesomeness of the maintenance and management are avoidable and the transmission quality and reliability of an optical fiber transmission line are improvable.

Yet additionally, in accordance with a further aspect of the present invention, there is provided a wavelength-multiplexing optical transmission system for transmitting wavelength-multiplexed light, comprising a first transmitting station for transmitting constant-intensity light and intensity-modulated light having a wavelength different from a wavelength of the constant-intensity light, and a second transmitting station for detecting a physical quantity arising from an amplitude variation of the constant-intensity light transmitted from the first transmitting station to set a reception dispersion compensation quantity on the basis of the detected physical quantity.

This can suppress the waveform distortion, thus easing the NF (Noise Figure) of an optical amplifier or the characteristic of a transmitter/receiver in design, which leads to relaxing the restrictions in specification on devices and parts constituting the optical amplifier and the transmitter/receiver, thereby promoting the parts cost reduction. Moreover, a manager can maintain the transmission capability or performance without taking into consideration the decrease in number of wavelengths of wavelength-multiplexed light, the shortening of distance, or the like.

In this case, it is possible that a dispersion compensator having a set reception dispersion compensation quantity is provided to compensate for dispersion of received light and the dispersion compensation quantity setting unit sets, in the dispersion compensator, a reception dispersion compensation quantity corresponding to a minimum physical quantity of a plurality of physical quantities arising from amplitude variations measured with respect to a plurality of reception dispersion compensation quantities. This allows a waveform distortion stemming from the self phase modulation SPM and a waveform distortion stemming from the cross phase modulation XPM to be separately evaluated by monitoring modulated light.

BRIEF DESCRIPTION OF THE DRAWINGS

FIGS. 4(a) to 4(g) are illustrations of one example of a modulation pattern signal according to the first embodiment of the present invention;

FIGS. 7(a) to 7(e) are illustrations useful for explaining a WDM transmission system according to the first embodiment of the present invention;

FIG. 22 is a flowchart useful for explaining a reception dispersion compensation quantity setting method according to the second embodiment of the present invention;

DESCRIPTION OF THE PREFERRED EMBODIMENTS

Embodiments of the present invention will be described hereinbelow with reference to the drawings.

(A) Description of First Embodiment of the Present Invention

Figure 1:
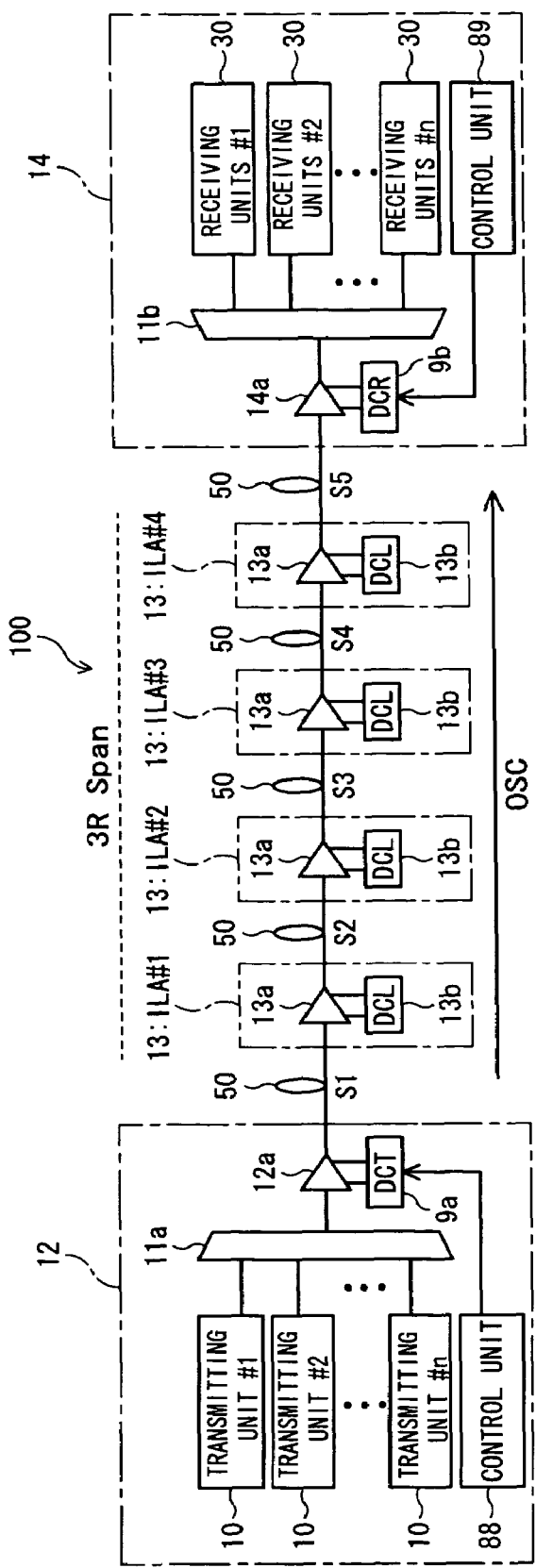
FIG. 1 is a schematic illustration of a configuration of a WDM transmission system according to a first embodiment of the present invention.

FIG. 1 is a schematic illustration of a configuration of a WDM transmission system according to a first embodiment of the present invention. The WDM transmission system shown in FIG. 1 is made up of a transmitting terminal node (transmitting terminal station, transmitting node or a transmitting terminal station unit) 12 and a receiving terminal node (receiving terminal station, receiving node or a receiving terminal station unit) 14 for transmitting wavelength-multiplexed light (wavelength-multiplexed signal light) obtained by multiplexing wavelengths different from each other inn channels (n represents a natural number)

(1) WDM Transmission System 100

(1-1) Outline of Configuration of WDM Transmission System

One example of the WDM transmission system 100 according to the present invention serves as a trunk network system. For example, nodes located in broad areas such as Tokyo, Hawaii and Los Angeles are connected through optical fibers to each other so that high-speed and large-capacity packet transmission/reception takes place. The WDM transmission system 100 is equipped with a transmitting terminal node 12, a receiving terminal node 14 and, for example, four repeating nodes (repeaters, repeater stations, repeating units or optical amplification repeating units) 13, and these nodes (the transmitting terminal node 12, the receiving terminal node 14 and the four repeating nodes 13) are connected through an optical fiber transmission line 50 to each other.

(1-2) Optical Fiber Transmission Line 50

The optical fiber transmission line 50 is a transmission line for the wavelength-multiplexed transmission of a monitor control signal (OSC [Optical Service Channel]) for notifying a unit state of each node and main signal light modulated by a main signal including information data such as speech, image and text. In general, at the propagation, each channel light constituting wavelength-multiplexed light undergoes phase modulation arising from dispersion (wavelength dispersion) and nonlinear optical effect so that a waveform distortion occurs.

Figure 10:
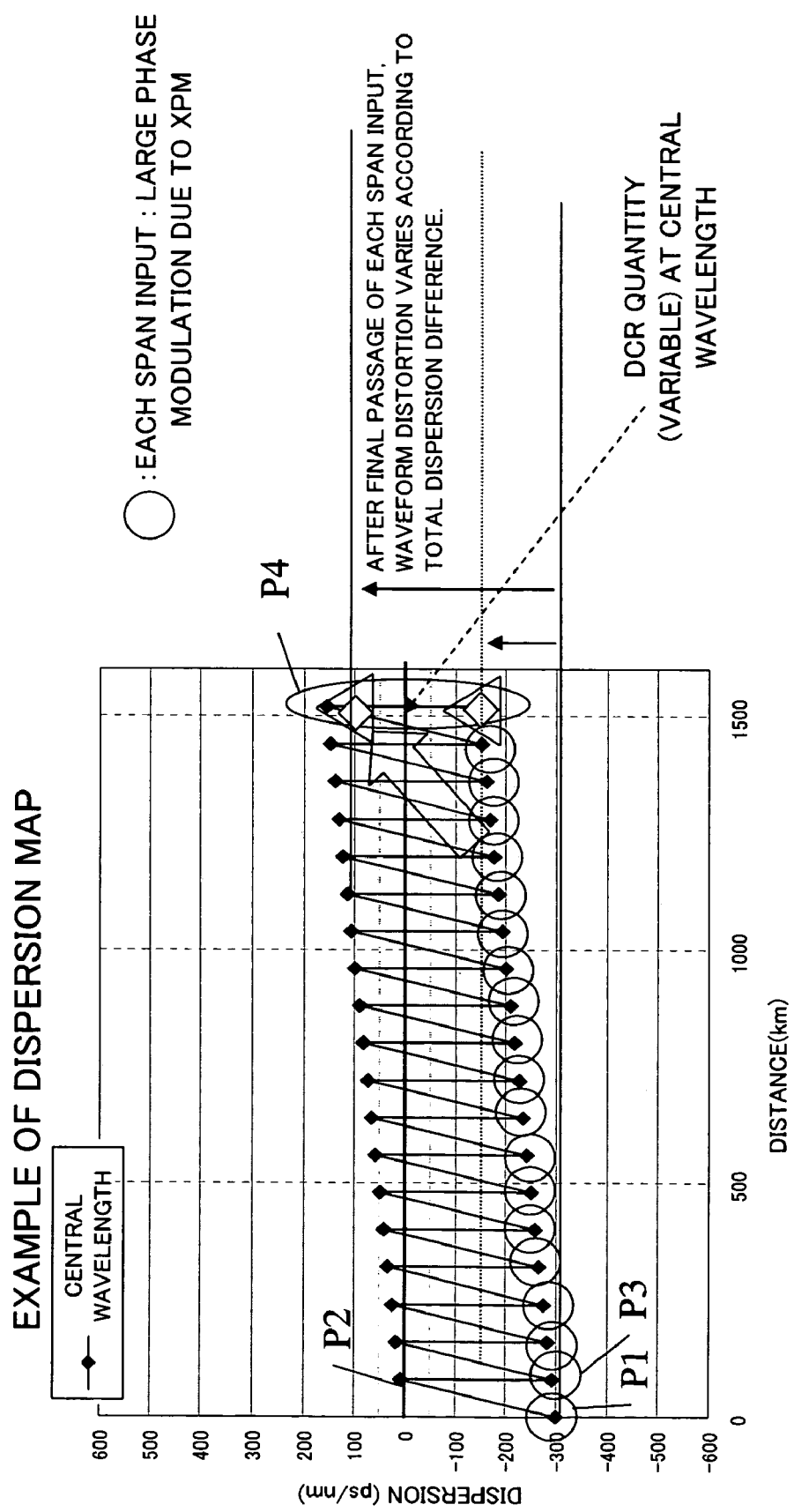
FIG. 10 is an illustration of one example of a dispersion map according to the first embodiment of the present invention.

Since the distance between the transmitting terminal node 12 and the receiving terminal node 14 (between Term-Term: which will hereinafter be referred to as "inter-terminal-node") is long, the accumulation of the degradation occurs due to the transmissions. The accumulation of the degradation will be described later with reference to a dispersion map (FIG. 10).

(1-3) Total Compensation Quantity (Value) for Entire Dispersion Quantity

Accordingly, a manager distributes (allocates) the total compensation quantity for the entire dispersion quantity to the respective nodes in advance so that each node takes care of the distributed compensation quantity. Moreover, detailed determinations are made about the location intervals of dispersion compensators, the intensity of transmitted light to be outputted from the dispersion compensator, and others.

In particular, the location interval is called a "span (zone)", and the dispersion compensators are provided in the respective units and, hence, the dispersion compensators are located before and after each span. Moreover, in a case in which the interval of the four repeating nodes 14 or the like is not constant, there is a need to optimize the dispersion compensation quantity (value) with high accuracy for each span. The WDM transmission system 100 shown in FIG. 1 has five spans marked with S1 to S5. Still moreover, the span between the transmitting terminal node 12 and the receiving terminal node 14 is referred to as a 3R (Retiming, Regenerating, Reshaping) span. In other words, the 3R span between the transmitting terminal node 12 and the receiving terminal node 14 is composed of the five spans S1 to S5.

Thus, the dispersion compensator in each node compensates for the compensation quantity forming a portion of the total compensation quantity, which acts as a brake upon the dispersion and the nonlinear optical effect in the entire WDM transmission system 100.

(1-4) Dispersion Compensation Quantity Setting Phase and Main Signal Transmission Phase The WDM transmission system 100 operates with a main signal transmission phase in which the transmitting terminal node 12 transmits wavelength-multiplexed light including a main signal to the receiving terminal node 14 and a dispersion compensation quantity setting phase in which, prior to the main signal transmission phase, the quantity of each of the self phase modulation SPM and the cross phase modulation XPM of the nonlinear optical effects occurring in the optical fiber transmission line 50 is measured to compensate for this quantity.

In the dispersion compensation quantity setting phase, immediately before the activation (operation) of the WDM transmission system 100, such as construction, extension, alteration or maintenance thereof, a manager manually or partially automatically (semi-automatically) sets a compensation quantity of a reception side dispersion compensator provided in the receiving terminal node 14.

In the main signal transmission phase, each node transmits and receives the wavelength-multiplexed light including the main signal. Incidentally, the transmission/reception function of the main signal in each node depends upon a generally known technique.

In the WDM transmission system 100, in the dispersion compensation quantity setting phase, the transmitting terminal node 12 or the receiving terminal node 14 searches for the minimum value of the reception dispersion compensation quantities in the receiving terminal node 14 (see FIG. 11(b) mentioned later) to set the minimum value, acquired by the search, in the dispersion compensator (DCR 9b in FIG. 1) of the receiving terminal node 14. With respect to a method of minimizing the reception dispersion compensation quantity, a detailed description will be given hereinbelow of each of the transmitting terminal node 12 and the receiving terminal node 14.

(1-5) Description of CW Light and Modulated Light

Figure 2:
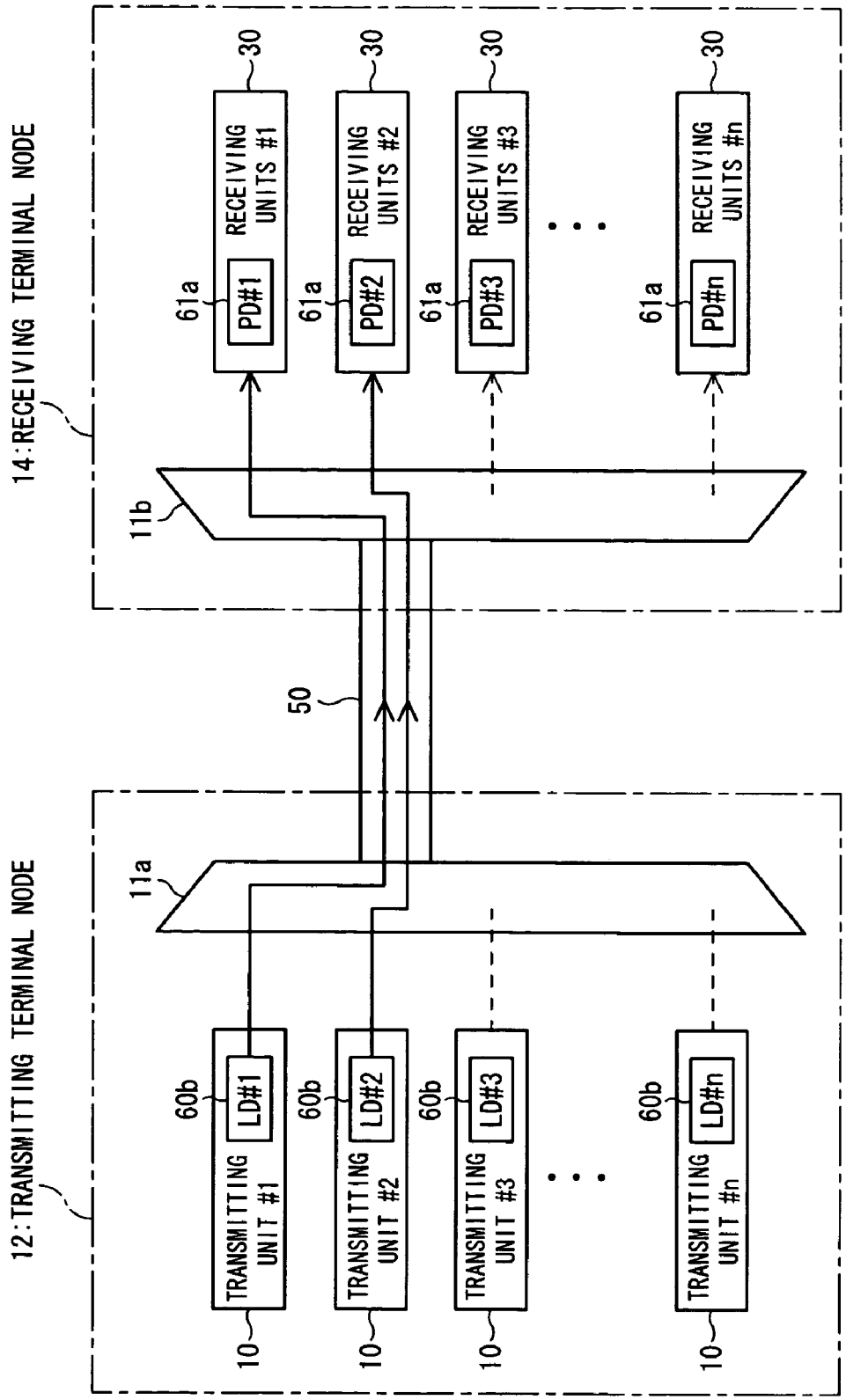
FIG. 2 is an illustration useful for explaining CW light and modulated light according to the first embodiment of the present invention.

FIG. 2 is an illustration useful for explaining CW light and modulated light according to the first embodiment of the present invention. In FIG. 2, the wavelengths $\lambda_1$ to $\lambda_n$ of output lights of n transmitting units 10 (marked with #1 to #n) are different from each other and are placed at a constant interval on an optical frequency (inverse number of optical wavelength) axis. Moreover, the transmitting terminal node 12 generates CW light (Continuous Wave Light) having a constant intensity. This CW light is producible through the use of a relatively simple circuit, and the CW light has less influence on other signal light. Still moreover, the transmitting terminal node 12 produces and transmits the CW light and modulated light obtained by the intensity modulation having a period T. For this intensity modulation having the period T, for example, there is used an alternating pattern (alternating pattern signal) of "1010", or the like.

In addition, it is desirable that the transmitted light from the transmitting terminal node 12 is only the CW light. Still additionally, as mentioned later with reference to FIG. 3, for example, the CW light is produced by an LN optical modulator (lithium niobate optical modulator) serving as an external modulator. On the other hand, since there is a case in which the LN optical modulator produces low-frequency modulated light by modulating the CW light with a low-frequency signal (low-frequency signal component), the WDM transmission system 100 are available for both the CW light transmission/reception and the low-frequency modulated light transmission/reception.

First, a description will be given hereinbelow of the transmission side.

As mentioned above, at the transmission (transmission step), the transmitting terminal node 12 transmits the CW light or low-frequency modulated light obtained by modulating the CW light with a low-frequency modulated signal. In the WDM transmission system 100, the CW light (or low-frequency modulated light) is set to have a wavelength $\lambda_1$ (channel #1) and the modulated light is set at a wavelength $\lambda_2$ (channel #2) adjacent to the $\lambda_1$. When the lights of these channels #1 and #2 are transmitted in a wavelength-multiplexed condition, a self phase modulation SPM proportional to an intensity variation of the modulated light itself occurs in the modulated light, and a cross phase modulation XPM proportional to the intensity modulation of the modulated light occurs in the CW light.

On the other hand, with respect to the reception side, as described later in detail with reference to FIG. 14, the receiving terminal node 14 once sets the reception dispersion compensation quantity of its own dispersion compensator (DCR 9b) at a desired value and monitors the CW light and the modulated light. Concretely, the receiving terminal node 14 measures the intensity modulated quantity of the CW light. The measurement of the CW light intensity modulated quantity signifies the acquisition of a physical quantity stemming from the cross phase modulation XPM. The intensity modulated quantity denotes a variation of the average intensity the CW light undergoes, which is acquired through a power detecting circuit after the light reception by a photodiode. The receiving terminal node 14 measures, in addition to the CW light intensity modulation quantity, an intensity modulation quantity of the modulated light. The measurement of the modulated light intensity modulation quantity signifies the acquisition of the magnitude of a waveform distortion originating from the self phase modulation SPM.

The receiving terminal node 14 sets the reception dispersion compensation quantity at a reception dispersion compensation quantity different from the set value and again measures the intensity modulation quantity of each of the CW light and the modulated light. Moreover, the receiving terminal node 14 repeats the setting operation for the reception dispersion compensation quantity and the measurement operation for the intensity modulation quantities of the CW light and the modulated light plural times, for example, five times, and extracts the minimum value of the intensity variation width, resulting from the amplitude variation, by using the reception dispersion compensation quantity as a parameter to set the reception dispersion compensation quantity of the dispersion compensator with this minimum value being taken as an optimum value.

Incidentally, in the dispersion compensation quantity setting phase, each of the transmitting units #3 to #n does not output the transmitted light. After the receiving terminal node 14 sets the dispersion compensation quantity, the main signal transmission phase starts, and the transmitting units #1 to #n output lights of the respective channels which in turn, are multiplexed and transmitted as the wavelength-multiplexed light.

The above description is summarized as follows. In this dispersion compensation quantity setting method, the transmitting terminal node 12 first transmits the CW light and the modulated light obtained by the modulation using a modulation pattern signal and having a wavelength different from the wavelength of the CW light (transmission step).

Subsequently, the receiving terminal node 14 detects a physical quantity stemming from the cross phase modulation XPM between the transmitting terminal node 12 and the receiving terminal node 14 on the basis of a variation (variation quantity) of the intensity of the CW light transmitted in the transmission step (detection step).

In addition, the receiving terminal node 14 sets a reception dispersion compensation quantity on the basis of a variation (variation quantity) of the physical quantity detected in the detection step (dispersion compensation quantity setting step).

Still additionally, in the detection step, a quantity related to the cross phase modulation XPM of the modulated light occurring between the transmitting terminal node 12 and the receiving terminal node 14 is detected as a physical quantity.

In this case, since the CW light and the modulated light, to be transmitted, are respectively constant-intensity light and intensity-modulated light, in this dispersion compensation quantity setting method mentioned above, the transmitting terminal node 12 transmits the constant-intensity light and the intensity-modulated light having a wavelength different from the wavelength of the constant-intensity light (transmission step), while the receiving terminal node 14 detects a physical quantity stemming from an amplitude variation of the constant-intensity light transmitted in the transmission step (detection step) and sets a reception dispersion compensation quantity on the basis of the physical quantity detected in the detection step (dispersion compensation quantity setting step).

Moreover, in the dispersion compensation quantity setting step, the receiving terminal node 14 varies the dispersion compensator provided therein to measure each physical quantity stemming from an amplitude variation for each of five kinds of reception dispersion compensation quantities obtained by, for example, the five-times measurements (measurement step), and the receiving terminal node 14 sets, in the dispersion compensator, a dispersion compensation quantity corresponding to the minimum value of the five physical quantities measured in the measurement step (minimum dispersion compensation quantity setting step).

Thus, the receiving terminal node 14 can receive the monitor light (CW light and modulated light), actually transmitted, to acquire an appropriate dispersion compensation quantity based on the cross phase modulation XPM. For example, in both the cases in which the transmission environment is different from the condition expected at the design and the difference in performance of the optical fiber, optical amplifier and others appears noticeably, the setting of an appropriate dispersion compensation quantity is feasible.

In addition, in the detection step, the receiving terminal node 14 receives the CW light and the modulated light (reception step), and detects a physical quantity arising from the cross phase modulation XPM on the basis of the quantity (degree) of an intensity modulation the CW light received in the reception step undergoes (intensity modulation monitoring step).

A description will be given hereinbelow of a configuration of each node.

(2) Transmitting Terminal Node 12

The transmitting terminal node 12 shown in FIG. 1 is made up of n transmitting units (optical transmitters) 10, a multiplexing unit (MUX) 11a, an EDFA (optical amplifier) 12a, a dispersion compensator for transmission (DCT) 9a, and a control unit (dispersion compensation quantity setting unit) 88.

(2-1) Transmitting Unit 10 and Control Unit 88

Figure 3:
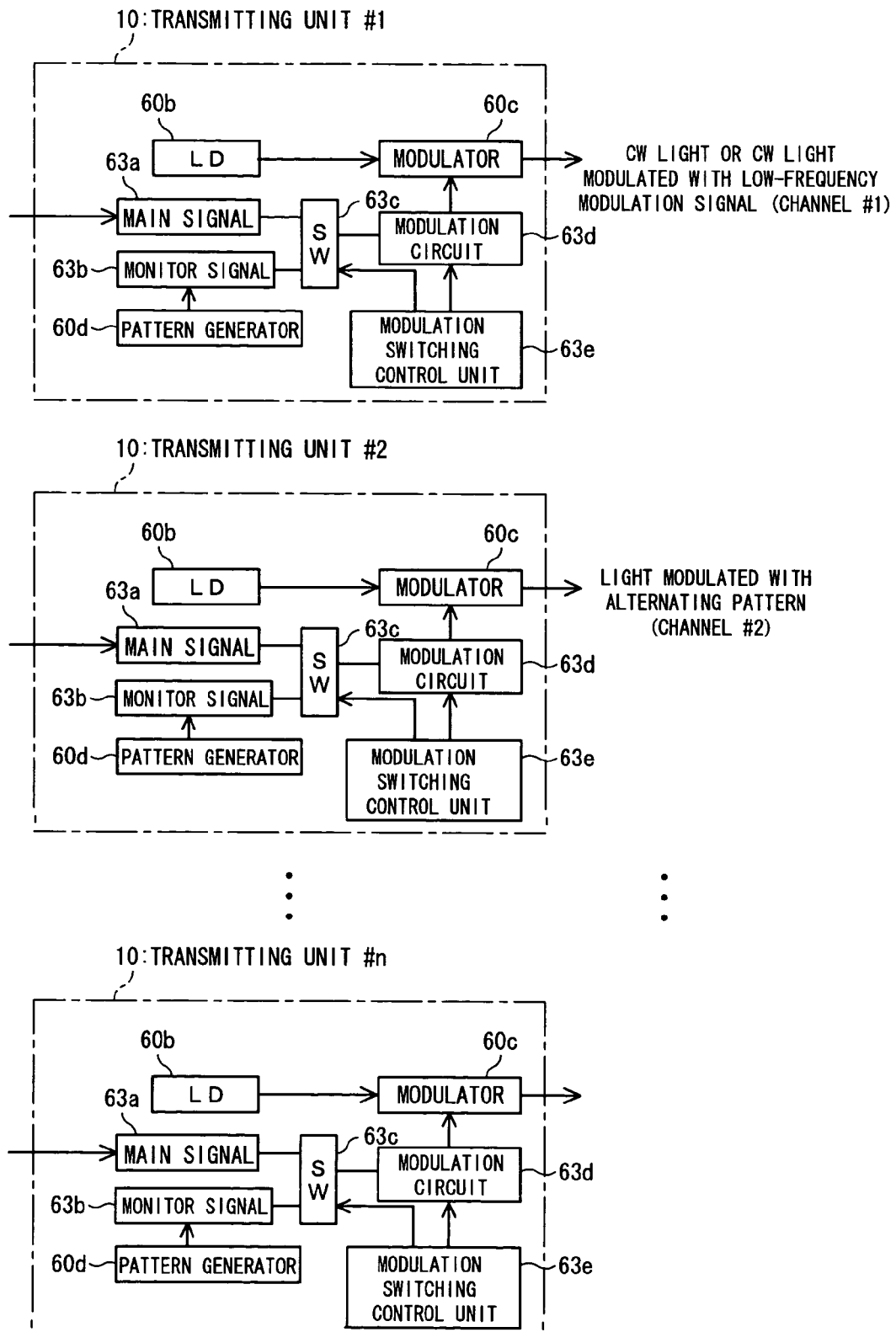
FIG. 3 is a block diagram showing a transmitting unit according to the first embodiment of the present invention.

FIG. 3 is a block diagram showing transmitting units 10 according to the first embodiment of the present invention. Each of the n transmitting units 10 shown in FIG. 3 is for outputting CW light having the wavelengths $\lambda_1$ to $\lambda_n$ (channels #1 to #n) and modulated light obtained by the modulation with one-or-more-wave modulation pattern signal and having any one $\lambda_k$ of the wavelengths $\lambda_1$ to $\lambda_n$. Concretely, the transmitting units 10 are provided with output wavelength fixed light-emitting devices capable of outputting the CW lights having the wavelengths $\lambda_1$ to $\lambda_n$ so that the CW lights having the wavelengths $\lambda_1$ to $\lambda_n$ different from each other can be outputted among the n transmitting units 10. Incidentally, as mentioned above, in place of the CW light, it is also acceptable to employ modulated light obtained by the modulation using a sufficiently low frequency.

Moreover, the control unit 88 (see FIG. 1) is principally for controlling the channel allocation such as "which of channels outputs CW light and which of channels outputs modulated light". In other words, the control unit 88 assigns one of the n transmitting units 10 for outputting the CW light and the modulated light.

In the following description, the transmitting unit 10 made to output the wavelength $\lambda_k$ (k depicts a natural number between 1 and n) will be referred to as a "transmitting unit #k". For example, the transmitting unit 10 (transmitting unit #1) marked with "#1" is for outputting the CW light of the channel #1 (that is, wavelength $\lambda_1$), and the transmitting unit 10 (transmitting unit #2) marked with "#2" is for outputting the CW light of the channel #2 (wavelength $\lambda_2$). As described later with reference to FIG. 14, the control unit 88 conducts the assignment processing by determining the output wavelength $\lambda_k$ of each transmitting unit 10 on the basis of the result of measurement of the intensity modulation quantity on the reception side.

The transmitting unit #1 shown in FIG. 3 is composed of a tunable laser diode (LD) 60*b*, a modulator 60*c*, a pattern generator 60*d*, a main signal outputting unit 63*a*, a monitor signal outputting unit 63*b*, a modulation circuit (modulating unit) 63*d*, a switch 63*c* and a modulation switching control unit 63*e*.

In this configuration, the tunable laser diode 60*b* acts as a light source made to output CW lights having the wavelengths $\lambda_1$ to $\lambda_n$, and a tunable laser diode (tunable laser diode module) capable of outputting while varying the oscillation wavelength is available therefor. The oscillation wavelength after activated can be set at a desired value and, for example, the CW light and the modulated light are assigned to the channels #1 and #2, respectively.

The intensity of this CW light is constant at the oscillation and, because of the transmission, this constant-intensity CW light develops a waveform distortion due to the cross phase modulation XPM of the modulated light of the channel adjacent thereto. In the receiving terminal node 14, the intensity of the CV light exposed to that waveform distortion is monitored and the stability of the received light (transmitted light) is monitored.

In addition, since there is a case in which, as mentioned above, the CW light outputted from an external modulator serving as the modulator 60*c* is modulated with a low-frequency signal, this dispersion compensation quantity setting method can employ low-frequency modulated light. That is, the dispersion compensation quantity setting method can employ both the method of transmitting the CW light and the method of transmitting the low-frequency modulated light.

The pattern generator 60*d* (see FIG. 3) is for generating modulation pattern signals (waveform pattern signals) in one or a plurality of electrical frequency areas, and is made to generate a modulation pattern signal such as an alternating pattern or a PN (Pseudo Noise) pattern (see FIGS. 4(*a*) to 4(*g*) mentioned later).

The monitor signal outputting unit 63*b* is for preparing, for example, the timing or the like of a modulation pattern signal from the pattern generator 60*d*, and the main signal outputting unit 63*a* is for receiving a main signal, obtained by packetizing information data such as voice, image, text and others, from, for example, another optical network (not shown) to output it to the modulation circuit 63*d*.

The modulator 60*c* is for modulating the CW light from the tunable laser diode 60*b* side with a modulation pattern signal from the pattern generator 60*d*. The function of this modulator 60*c* is realizable by, for example, an LN optical modulator (lithium niobate optical modulator). This LN optical modulator is designed to convert an electric signal into an optical intensity signal through the use of the Mach-Zehnder interferometer, and the wavelength variation component occurring at the production of modulated light is extremely small. The Mach-Zehnder interferometer is made to divide inputted light into two for varying the refractive indexes of the two divided optical paths in accordance with the inputted electric signals "1" and "0".

The switch 63*c* is for selecting the main signal outputting unit 63*a* or the monitor signal outputting unit 63*b*, and the modulation circuit 63*d* serves as a drive circuit to drive the modulator 60*c* through the use of an electric signal from the main signal outputting unit 63*a* or the monitor signal outputting unit 63*b*.

The modulation switching control unit 63*e* is designed to output a main signal in normal time and, when the present invention is applied, to carry out the control for outputting the CW light or the modulated light as needed.

Thus, the CW light outputted from any one #k (for example, transmitting unit #1) of the n transmitting units #1 to #n is directly outputted to the optical fiber transmission line 50, and the CW light outputted from the transmitting unit #k' (k' represents a natural number from 1 to n different from k. For example, the transmitting units #2 to #n) other than the transmitting unit #k is modulated by an alternating pattern signal such as "1010" and the modulated CW light is outputted to the optical fiber transmission line 50.

(2-2) Modulation Pattern Signal from Pattern Generator 60*d* and Modulated Light Secondly, a description will be given hereinbelow of one-or-more-wave modulation pattern signals outputted from the pattern generator 60*d* and modulated light.

FIGS. 4(*a*) to 4(*g*) are illustrations of one example of a modulation pattern signal according to the first embodiment of the present invention. The waveform shown in FIG. 4(*a*) shows a flat modulation pattern, and in the modulator 60*c*, this modulation pattern signal is modulated into the CW light with the wavelength $\lambda_k$, and the modulated light with the wavelength $\lambda_k$ is outputted therefrom. That is, the modulated light depends on one-wave modulation pattern signal. Moreover, as the modulation pattern signal, it is also possible to use a pattern like rectangular pulse (or NRZ [Non Return to Zero]) shown in FIG. 4(*c*).

In addition, the modulated light can also be made with a plurality of (for example, four waves) modulation pattern signals shown in FIG. 4(*b*), and it can also be made with a plurality of (for example, two waves) modulation pattern signals shown in FIG. 4(*d*).

Still additionally, as the modulation pattern signal, it is also possible to employ an alternating pattern having repeated "1010", a PN pattern and a sine-wave pattern of approximately 5 GHz, shown in FIGS. 4(*e*), 4(*f*) and 4(*g*). In this connection, it is preferable that the bit rate of the "1010" alternating pattern is a value approximately equal to the transmission bit rate B of the main signal light or a value which is approximately the half of the transmission bit rate B. For example, it is 10 Gbps (Gigabit per second).

Thus, the modulation pattern signal to be modulated into exciting light is modulated with one or a plurality of types different in wavelength from each other.

Therefore, for the transmission (transmission step), as the modulated light of the CW light and the modulated light, the transmitting terminal node 12 (see FIG. 1) transmits the modulated light, obtained by the modulation with, for example, an alternating pattern signal or a PN pattern signal, to the receiving terminal node 14. Moreover, each modulation pattern signal is modulated into CW light in the modulator 60c, and the modulated light is outputted to the optical fiber transmission line 50. Thus, the transmitting terminal node 12 transmits the modulated light obtained by the modulation with one modulation pattern signal or k modulation pattern signals different in wavelength from each other.

(2-3) Multiplexing Unit 11a (see FIGS. 1 and 2)

The multiplexing unit 11a multiplexes the CW lights with all the wavelengths $\lambda_1$ to $\lambda_n$ to output wavelength-multiplexed light.

Accordingly, with respect to the channel #1, the dispersion compensation quantity is monitored between the transmitting and receiving terminal nodes 12 and 14, and in the receiving terminal node 14, a desired compensation quantity is set for the channel #1 before the activation. Subsequently, the dispersion compensation quantity is set before the activation with respect to each of the channels #2, #3, . . . , #n.

Thus, since the main signal transmission phase starts after a dispersion quantity is compensated for with respect to each channel #k, the transmission degradation is suppressible and the long-distance transmission is feasible.

(2-4) EDFA 12a and DCT 9a (FIG. 1)

The EDFA 12a is for amplifying the wavelength-multiplexed light inputted thereto. The DCT 9a is for compensating for a predetermined dispersion quantity with respect to the wavelength-multiplexed light outputted from the EDFA 12a. The function of this DCT 9a is realizable with, for example, a fixed type shown in FIG. 5(b). The DCT 9a shown in FIG. 5(b) is constructed in a manner such that a plurality of (for example, three stages) DCFs (Dispersion Compensator Fiber) 34a are through optical amplifiers for the amplification of inputted light to each other. For example, the compensation quantities of the respective DCFs 34a are –100, –200 and –400 (ps/nm) (when viewed from the lower side in the illustration), respectively, and when the inputted light passes through these three-stage DCFs 34a, the compensation quantity of –700 (ps/nm) takes place thereon.

Moreover, the transmitting terminal node 12 is also designed to compensate for a dispersion quantity forming a portion of the total dispersion quantity of the entire WDM transmission system 100. The EDFA 12a can also be of a variable type shown in FIG. 9 as mentioned later.

Figure 5A:
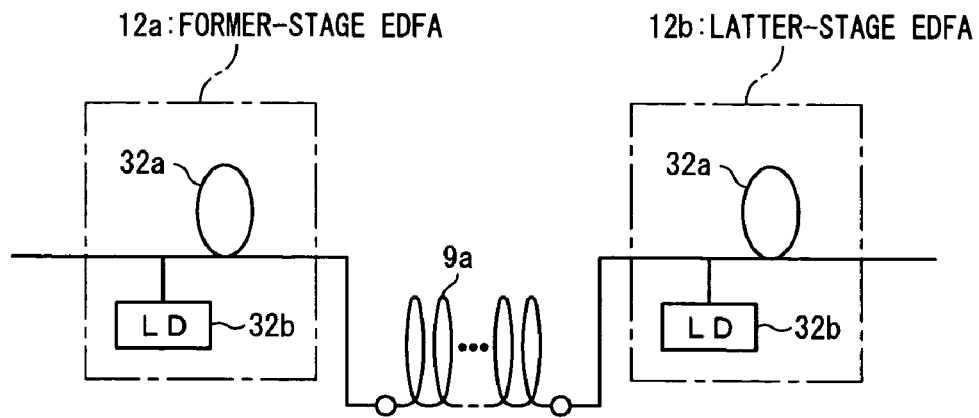
FIG. 5(a) is an illustration useful for explaining one example of amplification processing using an EDFA.
Figure 5B:
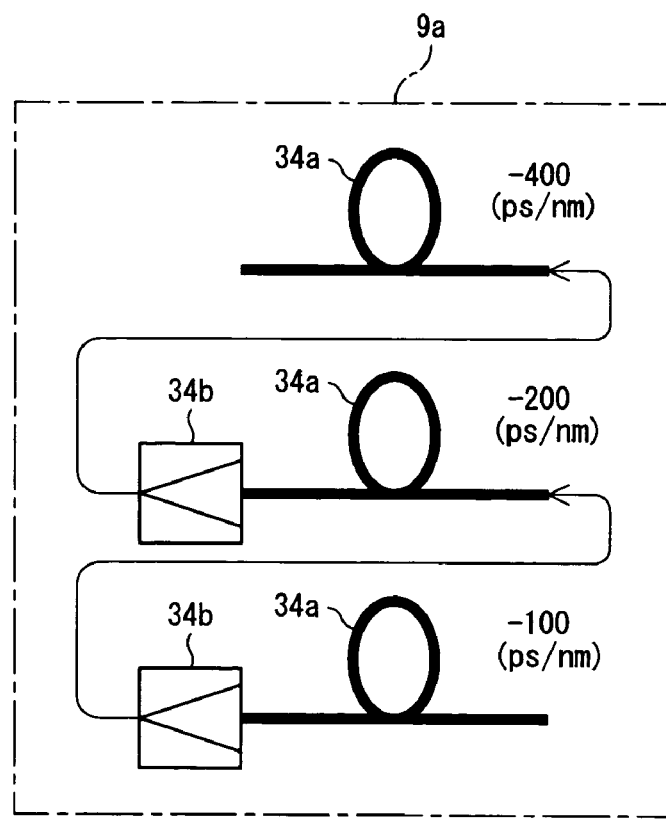
FIG. 5(b) is an illustration of one example of a dispersion compensator.

FIG. 5(a) is an illustration for explaining one example of amplification processing using the EDFA 12a. The EDFA 12a shown in FIG. 5(a) is composed of a former-stage EDFA 112a, a DCT 9a and a latter-stage EDFA 112b, and exciting light from a laser diode (LD: excitation light source) 32b is inputted to an EDF (Erbium-Doped Optical Fiber) 32a of the former-stage EDFA 112a to excite the Erbium by means of the inputted exciting light so that the excitation energy amplifies signal light passing through the EDF 32a. This amplified signal light is inputted to the DCT 9a and, after passing through the DCT 9a itself, the dispersion compensated signal light is outputted to be amplified in the latter-stage EDFA 112b and then outputted.

In this way, the CW lights or the modulated lights inputted from the transmitting units #1 to #n are amplified through the multiplexing unit 11a in each of the former-stage EDFA 112a and the latter-stage EDFA 112b and, after a predetermined dispersion quantity is added thereto in the DCT 9a, they are transmitted to the optical fiber transmission line 50.

Furthermore, a description will be given hereinbelow of the receiving terminal node 14.

(3) Receiving Terminal Node 14

The receiving terminal node 14 shown in FIG. 1 is designed to receive and demodulate the CW light and modulated light (including main signal light at the transmission of information data) from the optical fiber transmission line 50, and is composed of an EDFA (optical amplifier) 12a, a reception dispersion compensator (DCR) 9b, a demultiplexing unit 11b, n receiving units (optical receivers) 30 and a control unit (dispersion compensation quantity setting unit) 89. In this case, the receiving units marked with #1 to #n denote the receiving units 30 having the same configuration.

(3-1) Demultiplexing Unit 11b

The demultiplexing unit 11b is for demultiplexing the wavelength-multiplexed light into single-wavelength lights.

(3-2) Control Unit 89

The control unit 89 (FIG. 1) is designed to set a reception dispersion compensation quantity on the basis of a physical quantity detected in a power detecting circuit (detecting unit) 61d (FIG. 6 mentioned later), and functions as a dispersion compensation quantity setting unit. This control unit 89 (FIG. 1) calculates a reception dispersion compensation quantity on the basis of an intensity fluctuation of CW light (continuous-wave light) and a modulated component, with the intensity fluctuation being detected in a light-reception processing unit (a direct-current removing unit 61b, a power detecting circuit 61d and a direct-current component extracting unit 61c in FIG. 6) and the modulated component being extracted from modulated light.

The control unit 89 (FIG. 1) calculates a waveform distortion on the basis of the difference between an inputted residual dispersion quantity and an outputted residual dispersion quantity (target value of dispersion quantity included in received light) in an in-line amplifier 13a provided in each repeating node 13, and sets the dispersion compensation quantity of the DCR 9b so that the waveform distortions become at minimum at the simultaneous measurements of the respective waveform distortions. The functions such as measurement, detection and compensation are realizable through the cooperative operations of the DCR 9b and the control unit 89.

(3-3) DCR 9b

The DCR 9b is a dispersion compensator in which a reception dispersion compensation quantity is set to compensate for the dispersion of the received light. This DCR 9b is designed to add a predetermined dispersion quantity to the wavelength-multiplexed light outputted from the former-stage EDFA 12a, and it is a device capable of adjusting and changing the dispersion quantity through the setting from the external. As the adjusting method for the DCR 9b, there are employable a manual adjustment by a manger, an automatic adjustment based on a control signal from the external, and others. The function of this DCR 9b is exhibited with a dispersion compensator such as an etalon type, VIPA (Virtually Imaged Phased Array) type or FBG (Fiber Bragg Grating), or the like. The etalon type uses an etalon type filter. The FBG is an optical waveguide in which an optical waveguide whose refractive index varies periodically is formed in a quartz or the like for controlling light.

In addition, the control unit (dispersion compensation quantity setting unit) 89 is made to set, in the DCR 9b, a reception dispersion compensation quantity corresponding to a minimum physical quantity of n physical quantities arising from amplitude variations, for example, measured with respect to the reception dispersion compensation quantities of n channels.

Figure 9:
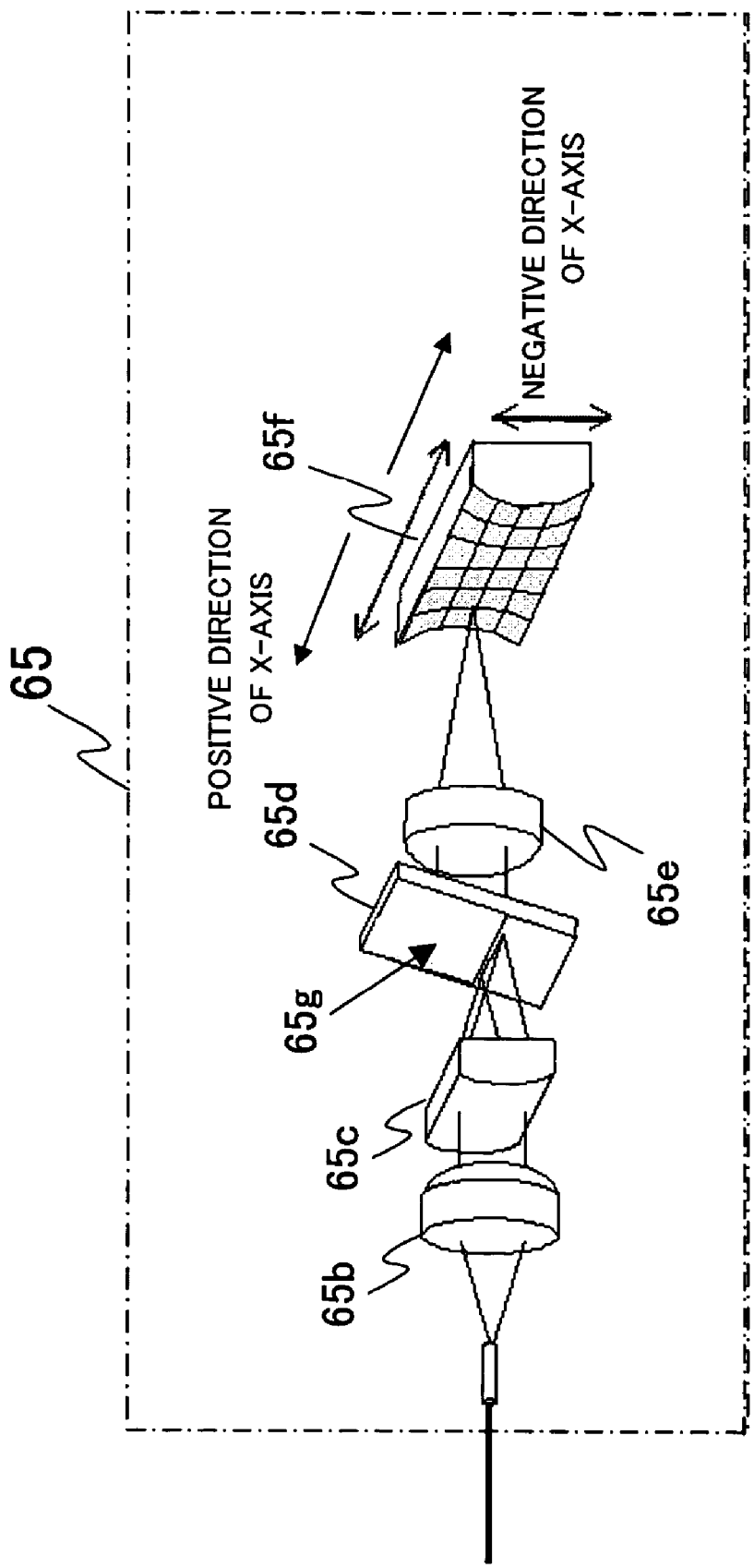
FIG. 9 is an illustration of one example of a VIPA type dispersion compensator.

FIG. 9 is an illustration of an example of configuration of the VIPA. The VIPA type dispersion compensator 65 shown in FIG. 9 is a kind of wavelength dispersion device in which both surfaces of a VIPA glass plate 65d having a small width are coated with an optical reflection film 65g having a reflectance of 100%, and it is equipped with condenser lenses 65b, 65c and 65e each of which allows the incident light to pass in one direction, the VIPA glass plate 65d in which the upper half surface of the input side is coated with the optical reflection film 65g and the lower half surface thereof is processed to have a transmissivity of 100%, and a three-dimensional mirror (reflection mirror) 65f. The incident WDM light is repeatedly reflected on inner walls of an internal medium of the VIPA glass plate 65d so that the demultiplexing (separation) into single-wavelength lights takes place. In a case in which a positive dispersion compensation quantity and a negative dispersion compensation quantity are assigned with respect to the demultiplexed single-wavelength lights, the single-wavelength light from the condenser lens 65e is condensed in each of the X-axis positive and negative directions.

Incidentally, this dispersion compensation function is also realizable in a manner such that the wavelength-multiplexed light is transmitted through the DCF itself.

In this case, the receiving units #1 to #n of the receiving terminal node 12 (FIG. 1 and others) simultaneously monitor the CW lights and the modulated lights to measure the intensity modulation quantities of the CW lights for acquiring the waveform distortion stemming from the cross phase modulation XPM so that the dispersion compensation quantity is determined so as to minimize the influence of the cross phase modulation XPM.

In this case, the reason why both the DCR 9b and the control unit 89 simultaneously monitor both the self phase modulation SPM and the cross phase modulation XPM is that the waveform distortion quantities stemming therefrom differ from each other. Concretely, for optimizing the dispersion quantity, when the control unit 89 determines the compensation quantity to minimize the waveform distortion stemming from one of the self phase modulation SPM and the cross phase modulation XPM, the other waveform distortion shifts from the optimum point. Accordingly, the DCR 9b is made to set the waveform distortion due to the self phase modulation SPM and the waveform distortion due to the cross phase modulation XPM at proper magnitudes while maintaining a range determined in the system specification.

(4) Receiving Units #1 to #n

Figure 6:
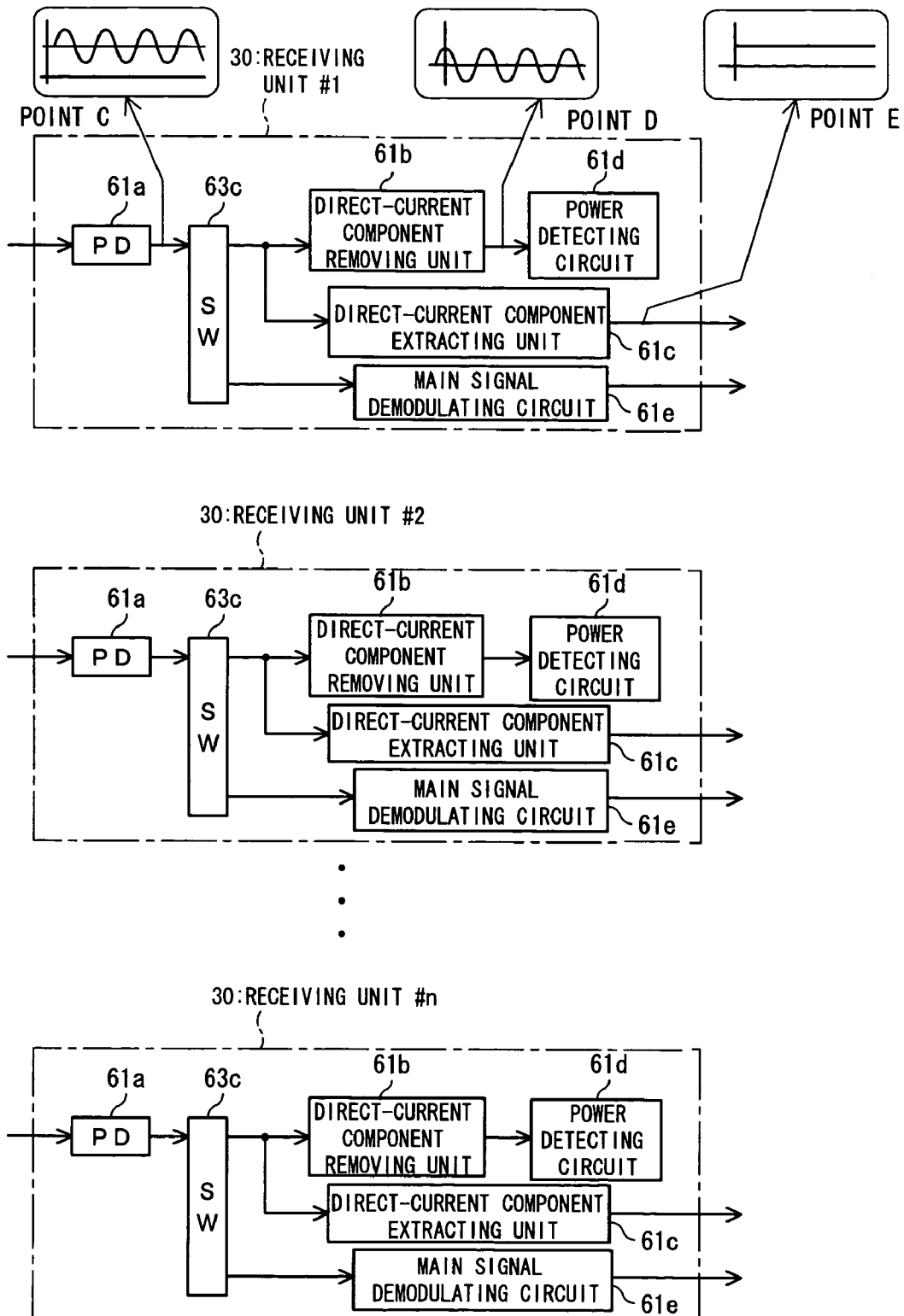
FIG. 6 is a block diagram showing a plurality of receiving units according to the first embodiment of the present invention.

FIG. 6 is a block diagram showing the receiving units #1 to #n according to the first embodiment of the present invention. Each of the receiving units #1 to #n shown in FIG. 6 conducts the reception processing on a main signal and further conducts the reception processing on CW light with a wavelength modulated light with a wavelength $\lambda_k$ obtained by the modulation using one-or-more-wave modulation pattern signal, outputted from the transmitting terminal node 12 in the WDM transmission system 100, and it is composed of a photodiode (PD) 61a serving as a light-receiving device, a direct-current component removing unit (direct-current cutting unit) 61b, a switch 63c, a power detecting circuit (power detecting unit) 61d, a direct-current component extracting unit 61c and a main signal demodulating unit (main signal demodulating circuit) 61e.

The receiving units #1 to #n are not always required to include the processing circuits for the CW light and the modulated light with respect to all the wavelengths $\lambda_1$ to $\lambda_n$. In this respect, the transmitting units #1 to #n (see FIG. 3) also apply thereto.

(4-1) Photodiode 61a

The photodiode 61a is made to output an electric signal corresponding to an intensity (power) of received light, and the current value of the electric signal to be outputted has no relation to the band of each single-wavelength light but depending upon the light-reception intensity.

The photodiode 61a is made to output an electric signal by receiving transmitted light of a channel outputted from the demultiplexing unit 11b (FIG. 1), and the schematic waveform (see point C in FIG. 6) of the outputted electric signal contains a direct-current component and a fluctuation component. Moreover, the photodiode 61a receives only the oscillation wavelength component outputted from the laser diode 60a of the transmitting terminal node 12.

After received, the CW light with the wavelength $\lambda_1$ from the transmitting terminal node 12 is inputted to the direct-current component removing unit 61b, and the modulated light with the wavelength $\lambda_k$ is inputted to the direct-current component extracting unit 61c.

(4-2) Direct-Current Component Removing Unit 61b

The direct-current component removing unit 61b is made to output an electric signal after cutting a direct-current component contained in the electric signal from the photodiode 61a, and the output waveform shows only the intensity fluctuation component stemming from the cross phase modulation XPM after the removal of only the direct-current component. That is, the direct-current component removing unit 61b takes out a modulated component occurring due to an intensity modulated component in the adjacent channel and detects only the modulated component. This demodulates a modulation pattern produced in the transmitting terminal node 12 and, for example, makes the demodulation on an alternating pattern such as "1010", a PN pattern and a sine-wave pattern of approximately 5 GHz.

(4-3) Power Detecting Circuit 61d

The power detecting circuit 61d is made to detect a physical quantity arising from the cross phase modulation XPM between the transmitting terminal node 12 and the receiving terminal node 14 on the basis of the CW lights and the modulated lights received by the receiving units #1 to #n. In other words, the power detecting circuit 61d functions as a light-reception processing unit (direct-current component removing unit 61b, direct-current component extracting unit 61c, power detecting circuit 61d).

The power detecting circuit 61d outputs, as a reception intensity (received light intensity), an average value obtained by performing the time-averaging on a modulated component outputted from the direct-current component removing unit 61b. Since the CW light is outputted from the transmitting terminal node 12 in a state where its intensity is constant, an amplitude variation (intensity modulation quantity) of a fluctuation component is easily acquirable through the calculation of the difference between the reception intensity and the constant intensity. The intensity modulation quantity acquired in the power detecting circuit 61d is an object of monitor in the control unit 89.

In addition, with respect to amplitude variations of low-frequency modulated light produced by modulating the CW light (constant-intensity light), undergoing the light-reception processing in the light-reception processing unit (61b, 61c, 61d), with low-frequency modulation signal light, the power detecting circuit 61d detects independently an amplitude variation due to the self phase modulation SPM of the modulated light occurring in proportion to an intensity variation of the low-frequency modulated light itself and an amplitude variation due to the cross phase modulation XPM of the low-frequency modulated light occurring in proportion to an intensity modulation of the low-frequency modulated light.

In this connection, the function of the power detecting circuit 61d is exhibited by, for example, a squaring circuit, and the square value is monitored as an intensity modulation quantity.

(4-4) Direct-Current Component Extracting Unit 61c

The direct-current component extracting unit 61c is made to extract a direct-current component contained in an electric signal obtained by the light reception in the photodiode 61a (for example, see point E).

Moreover, the cooperative operation of the direct-current component removing unit 61b, the direct-current component extracting unit 61c and the power detecting circuit 61d provides a function as a light-reception processing unit to carry out the light-reception processing on constant-intensity light transmitted from the transmitting terminal node 12 and intensity modulated light having a wavelength different from the wavelength of the constant-intensity light.

(4-5) Main Signal Demodulating Unit 61e

The main signal demodulating unit 61e is made to demodulate a main signal contained in wavelength-multiplexed light in the case of the main signal transmission phase.

(4-6) Switch 63c

In the receiving unit #k corresponding to the wavelength of the CW light transmitted, the switch 63c switches a signal from the photodiode 61a to the direct-current component removing unit 61b and the direct-current component extracting unit 61c while, in a case in which the corresponding wavelength channel is in the main signal transmission, switching it to the main signal demodulating unit 61e side.

(4-7) Description of Monitor Processing

In this way, in FIG. 6, a direct-current component is removed from the CW light with the wavelength $\lambda_1$ in the direct-current component removing unit 61b and the fluctuation component is inputted to the power detecting circuit 61d to measure a power variation component. Moreover, in the direct-current component extracting unit 61c, a direct-current component is extracted from the modulated light obtained by the modulation with a modulation pattern signal, thereby measuring the power of the direct-current component.

FIGS. 7(a) to 7(e) are illustrations useful for explaining a WDM transmission system according to the first embodiment of the present invention. In this case, in the transmitting unit 10, the channel #k is made to output modulated light and the channel #m is made to output CW light. Moreover, in the DCR 9b, there is set a specified dispersion compensation quantity (FIG. 7(b)). In the intensity of the channel #k to be outputted from the point A of the transmitting terminal node 12 shown in FIG. 7(a), peaks (high portions) and bottoms (low portions) respectively corresponding to "1" and "0" appear in a cycle Tin accordance with a modulation pattern. On the other hand, the intensity of the channel #m undergoes no modulation or modulation with a low-frequency signal so that it is almost constant.

As shown in FIG. 7(c), the channel #k undergoes phase modulation due to the self phase modulation SPM, and the channel #m is exposed to the influence of the cross phase modulation XPM in conjunction with the channel #k.

The receiving terminal node 14 changes the dispersion compensation quantity of the DCR 9b to measure an optical power variation quantity of the channel #m. Thus, the cross phase modulation XPM is reduced so that the occurrence of the inter-code interference is preventable in the receiving terminal node 14.

Therefore, for example, in the simulation or design, there is no need for a designer to locate a dispersion compensator at a specified position of the optical fiber transmission line 50, and it is possible to eliminate the need for the adjustment operation on each dispersion compensator in a case in which dispersion compensators are provided in the middle of the optical fiber transmission line 50. This can avoid the troublesome maintenance and management of the WDM transmission system 100 and can improve the transmission quality and reliability of the optical fiber transmission line 50.

(4-8) Receiving Units #2 to #n (FIG. 1)

The receiving units #2 to #n are for carrying out the reception processing on the CW light with the wavelength $\lambda_1$ and the modulated lights with the wavelengths $\lambda_2$ to $\lambda_n$ obtained by the modulation using one-or-more-wave modulation patterns, outputted from the transmitting terminal node 12. As a parameter available as a reception intensity thereof, the intensity modulation degree of the received optical signal can be taken, so a reception intensity is obtainable with higher accuracy.

The receiving units #2 to #n has the same configuration as that of the receiving unit #1 for the channel #1 except that their reception channels differ from the channel #1, and the description thereof will be omitted for avoiding the double explanation. Moreover, in the receiving terminal node 14, the components marked with the same reference numerals as those used for the transmitting terminal node 12 have the same or corresponding functions.

(4-9) Peak/Bottom Detecting Unit

A description will be given hereinbelow of the peak/Bottom detection.

Figure 8:
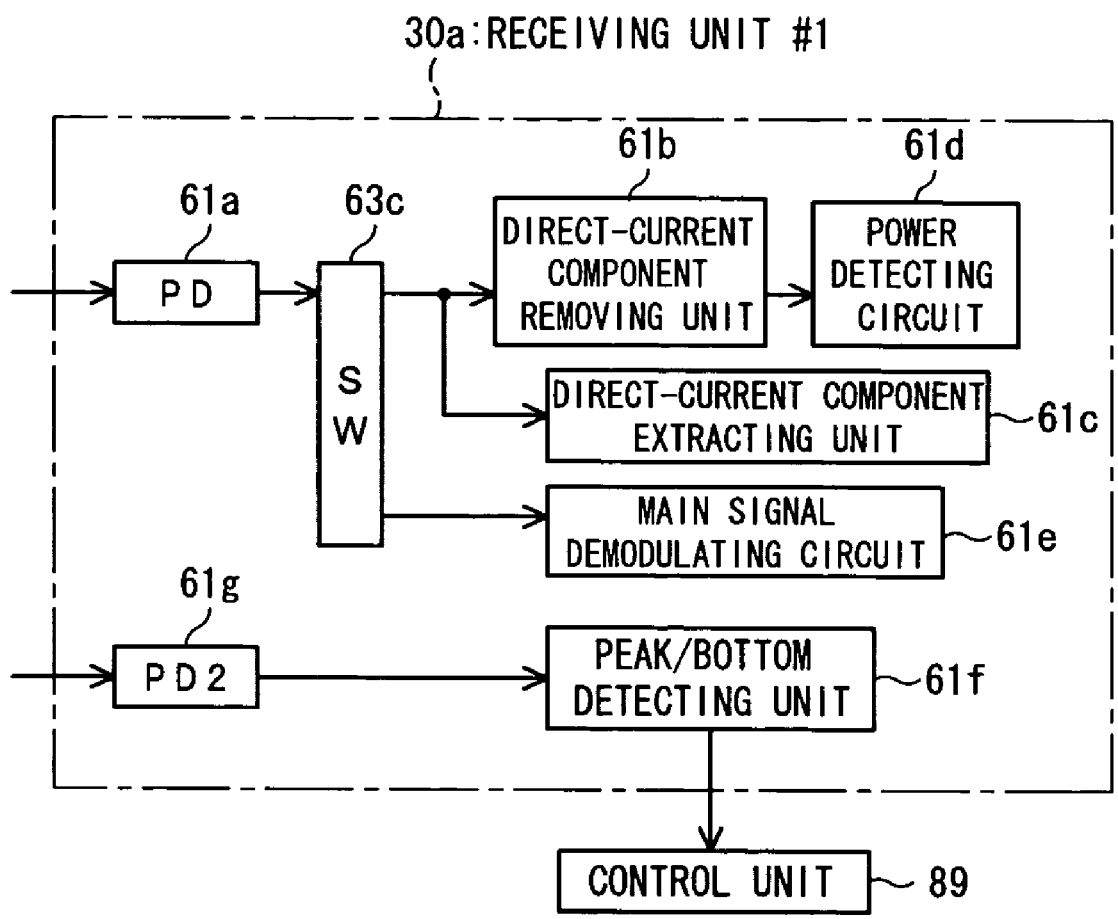
FIG. 8 is a block diagram showing a receiving unit equipped with a peak/bottom detecting function according to the first embodiment of the present invention.

FIG. 8 is a block diagram showing a receiving unit equipped with a peak/bottom detecting function according to the first embodiment of the present invention. In FIG. 8, a receiving unit 30a is made up of a photodiode 61a for receiving CW light, a photodiode 61g for receiving both the CW light and modulated light and a peak/bottom detecting unit 61f for detecting a peak value of an amplitude of the received light and a bottom value thereof. The peak/bottom detecting unit 61f is connected to a control unit 89 for setting a dispersion compensation quantity of a DCR 9b (FIG. 1). The parts other than the above-mentioned components, marked with the same reference numerals as those used in the above description, are the same as those mentioned above.

The control unit 89 calculates an amplitude variation between a peak value and a bottom value of an amplitude extracted in the peak/bottom detecting unit 61f and retains this calculation result as an intensity variation width of the amplitude, and graphs the relationship between the reception dispersion compensation quantity and the intensity variation width. Moreover, the control unit 89 further detects a portion of a curve where the intensity variation is at a minimum.

Thus, the CW light having only the oscillation wavelength component of the channel #1 is received by the photodiode 61a of the receiving unit 30a to output an electric signal, and a direct-current component of this electric signal is cut in a direct-current component removing unit 61b so that only the variation component is inputted to a power detecting circuit 61d.

In addition, the modulated components outputted from the direct-current component removing unit 61b are time-averaged in the power detecting circuit 61d, with this average value being outputted as a reception intensity.

(5) Repeating Node 13

Each of the repeating nodes 13 shown in FIG. 1 is made to amplify the received light and further to carry out the compensation for, of the total dispersion quantity of the entire WDM transmission system 100, a proper dispersion compensation quantity distributed in advance, and this function can be exhibited by an ILA (In Line Amplifier: optical amplifier) 13a and a DCL (Dispersion Compensator for Lines line side dispersion compensator, transmission line dispersion compensator) 13b. The DCL 13b is for compensating for the dispersion of wavelength-multiplexed light in the optical fiber transmission line 50.

The location of each of the DCLs 13b is determined on the basis of various types of factors such as a physical characteristic of the optical fiber transmission line 50, the positions and location interval of the dispersion compensators and the intensity of transmitted light to be outputted from the dispersion compensator. In this case, the location signifies the performance and type of the dispersion compensator to be provided in each repeating node 13 and the dispersion compensator locating method. Therefore, each repeating node 13 compensates for a dispersion quantity forming a portion of the total dispersion quantity of the entire WDM transmission system 100.

Accordingly, the WDM transmission system 100 for transmitting wavelength-multiplexed light is made up of a transmitting terminal node 12 for transmitting CW light (constant-intensity light) and intensity-modulated light (modulated light) having a wavelength different from a wavelength of the CW light and a receiving terminal node 14 for detecting a physical quantity stemming from an amplitude variation of the constant-intensity light transmitted from the transmitting terminal node 12 to set a reception dispersion compensation quantity on the basis of the detected physical quantity.

Furthermore, between the transmitting terminal node 12 and the receiving terminal node 14, there is provided an ILA 13a which is made to detect a physical quantity arising from an amplitude variation of the constant-intensity light transmitted from the transmitting terminal node 12 for setting a reception dispersion compensation quantity on the basis of the detected physical quantity.

Thus, the setting of the dispersion compensation quantity is made by the ILA 13a provided between the transmitting terminal node 12 and the receiving terminal node 14, thereby compensating more appropriately for the dispersion quantity.

(6) Description of Dispersion Compensation Quantity Setting Method

Referring to FIGS. 10 to 15, a detailed description will be given hereinbelow of examples of a wavelength-multiplexed light dispersion compensating method and a dispersion compensation quantity setting method according to the first embodiment of the present invention.

(6-1) Dispersion Map

FIG. 10 is an illustration of one example of dispersion map according to the first embodiment of the present invention. The dispersion map shown in FIG. 10 shows a dispersion quantity of inputted light at the inputting to each span (repeating node 13) and a dispersion quantity of the outputted light at the outputting from each span. In this map, portions circled denote repeating nodes 13, and variations of dispersion quantity appear in a case in which transmitted light is transmitted through a large number of repeating nodes 13 including four repeating nodes 13 shown in FIG. 1. This dispersion quantity is represented by a time delay in a unit length of the optical fiber transmission line 50 and is expressed using a wavelength (central wavelength) of a central portion of a band the wavelength-multiplexed light uses. A dispersion map about the WDM transmission system 100 is made out in this way.

For example, the dispersion quantity of inputted light at the transmission end is −300 ps/nm (see P1). When this light is transmitted, it is exposed to the influence of the phase modulation due to the cross phase modulation, and the dispersion quantity at the first repeating node 13 increases by 300 ps/nm and becomes −0 ps/nm (see P2). The first repeating node 13 amplifies the transmitted light and carries out the dispersion compensation and again outputs transmitted light of −300 ps/nm (see P3).

In general, the dispersion quantity is compensated for in relatively modest fashion for each span and, hence, it is difficulty that each repeating node 13 greatly adjusts the dispersion quantity. Therefore, the DCT 9a of the transmitting terminal node 12 and the DCR 9b of the receiving terminal node 14 compensate for a large dispersion quantity, which contributes greatly to the improvement of the dispersion quantity.

In this connection, an increase in dispersion quantity and the compensation of the dispersion quantity are repeated, and the dispersion quantity of the inputted light in the repeating node 13 gradually increases with an increase in transmission distance. In general, the waveform distortion of the wavelength-multiplexed light depends on the total dispersion quantity. Concretely, the waveform distortion quantity varies between a case in which the receiving terminal node 14 is positioned at a transmission distance of approximately 500 km and a case in which it is positioned at a transmission distance of approximately 1100 km.

Secondly, referring to FIGS. 11(a) and 11(b), a description will be given of the relationship between a reception dispersion compensation quantity and an intensity variation quantity with respect to the cross phase modulation XPM, and referring to FIGS. 12(a) and 12(b), a description will be given of the relationship between a reception dispersion compensation quantity and an intensity variation quantity with respect to the self phase modulation SPM, and further, referring to FIGS. 13(a) to 13(c), a description will be given of a method of setting a dispersion compensation quantity in consideration of both the cross phase modulation XPM and the self phase modulation SPM.

Figure 11B:
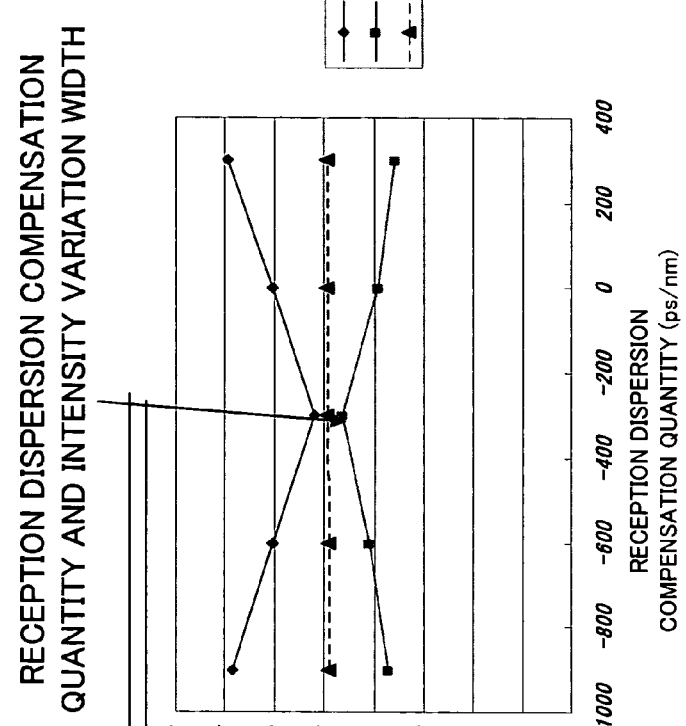
FIG. 11(b) is an illustration of an amplitude variation according to the first embodiment of the present invention.
Figure 11A:
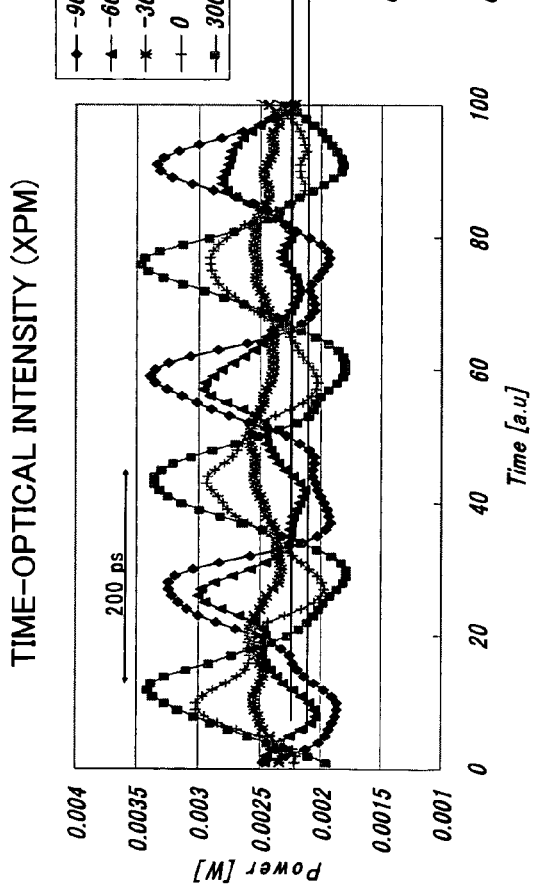
FIG. 11(a) is an illustration of one example of a reception light waveform according to the first embodiment of the present invention.

(6-2) Relationship Between Reception Dispersion Compensation Quantity and Intensity Variation Quantity with Respect to Cross Phase Modulation XPM FIG. 11(a) is an illustration of one example of light-reception waveform according to the first embodiment of the present invention, and shows a variation of the cross phase modulation XPM when the reception dispersion compensation quantity varies from −900 ps/nm to +300 ps/nm. In FIG. 11(a), five waveforms represent "waveforms themselves" in the receiving terminal node 14, which appear in a case in which the channel #1 is set in the vicinity of the central wavelength in the dispersion map shown in FIG. 10. Moreover, the five waveforms depict the cases in which the reception dispersion compensation quantities in the receiving terminal node 14 are −900, −600, −300, 0 and +300 ps/nm. Still moreover, of the five waveforms, the waveforms corresponding to the reception dispersion compensation quantities of −900 and +300 ps/nm show a large amplitude variation and a large intensity variation. On the other hand, the waveform corresponding to the reception dispersion compensation quantities of −300 ps/nm shows a small amplitude variation and a small intensity variation.

With respect to these reception dispersion compensation quantity and the magnitude of the intensity variation, difficulty is experienced in setting the compensation quantity adaptively in accordance with the transmission condition after the system is once constructed.

On the other hand, according to this dispersion compensation quantity setting method, the transmitting terminal node 12 side varies, as a parameter, the reception dispersion compensation quantity, described hereinbelow, to various values, and the receiving terminal node 14 side measures a physical quantity of the received light for each reception dispersion compensation quantity to determine the minimum quantity of the plurality of reception dispersion compensation quantities measured. The WDM transmission system 100 cannot acquire the data on the magnitude of the amplitude variation before the system construction. For example, difficulty is encountered in acquiring the data representative of the fact that the waveform corresponding to the reception dispersion compensation quantity of −300 ps/nm of the five types of reception dispersion compensation quantities shown in FIG. 11(a) shows the smallest amplitude variation.

For this reason, according to this dispersion compensation quantity setting method, for example, the receiving terminal node 14 side changes the five types of reception dispersion compensation quantities variously to acquire the condition that the variation width of the waveform distortion due to the cross phase modulation XPM becomes at a minimum.

FIG. 11(b) shows an amplitude variation in a state where this reception dispersion compensation quantity is used as a parameter. The control unit 89 increments the reception dispersion compensation quantity from −900 (ps/nm) up to +300 (ps/nm) to measure the respective data shown in FIG. 11(b), thereby acquiring the characteristic of the waveform distortion arising from the cross phase modulation XPM. Thus, the control unit 89 learns that the intensity variation becomes at a minimum when the dispersion compensation is made with respect to the reception dispersion compensation quantity of −300 (ps/nm). Therefore, through the sweep of the physical quantity stemming from the cross phase modulation XPM, it is possible to obtain the condition that the variation width of the waveform distortion due to the cross phase modulation XPM becomes at a minimum.

As described above, according to this dispersion compensation quantity setting method, the control unit 89 can specify the reception dispersion compensation quantity (for example, −300 ps/nm) so that the cross phase modulation XPM is reducible. Therefore, when a dispersion compensator is provided in the receiving terminal node 14 at the transmission end, the compensation for the dispersion quantity is effectively feasible and the working efficiency on the maintenance and management is considerably improvable.

A concrete example of the sweep will be described later with reference to FIG. 14.

(6-3) Relationship between Reception Dispersion Compensation Quantity and Intensity Variation Width with Respect to Self Phase Modulation SPM FIGS. 11(a) and 11(b) are illustrations for explaining a method of searching and adjusting the optimum condition based on the cross phase modulation XPM.

Furthermore, a description will be given hereinbelow of a method of searching the optimum condition based on the self phase modulation SPM coupled with the cross phase modulation XPM in a state where the reception dispersion compensation quantity is used as a parameter.

Figure 12A:
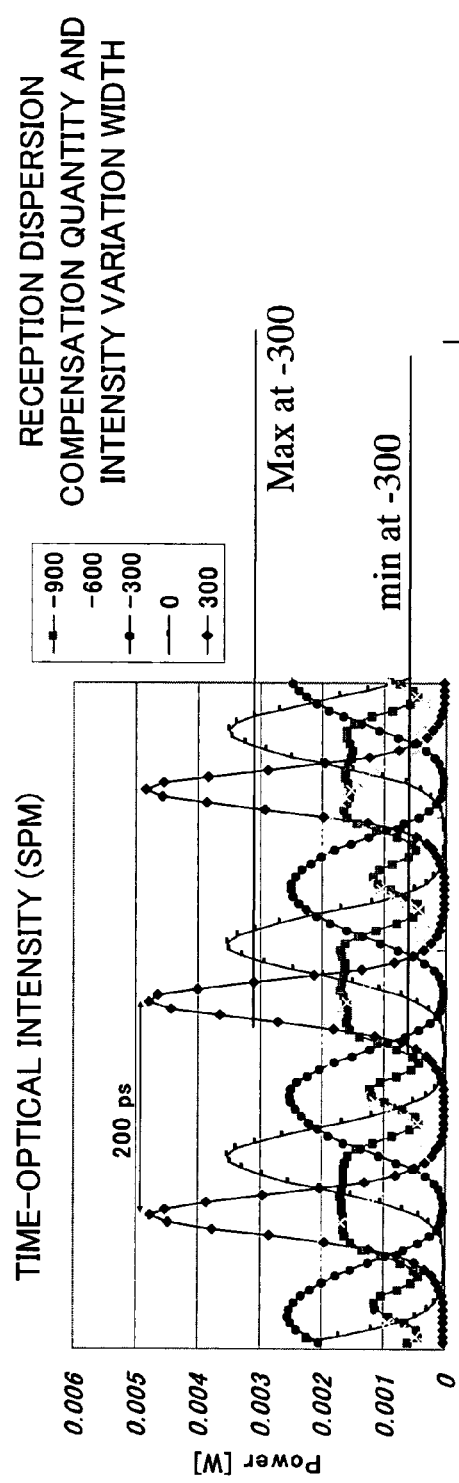
FIG. 12(a) is an illustration of one example of a reception light waveform according to the first embodiment of the present invention.

FIG. 12(a) is an illustration of one example of a light-reception waveform according to the first embodiment of the present invention, which is related to the cross phase modulation XPM. FIG. 12(b) is an illustration of the relationship between a reception dispersion compensation quantity and an intensity variation width according to the first embodiment of the present invention. In this case, the intensity variation width is expressed by quantifying a waveform distortion and, concretely, it corresponds to an amplitude variation quantity between a peak value of an amplitude of received light and a bottom value thereof.

The control unit 89 (FIG. 1) detects the maximum value and the minimum value of five light-reception waveforms shown in FIG. 12(a). For example, the maximum and minimum values of the amplitude variation occurring in a case in which the reception dispersion compensation quantity is +300 ps/nm are 0.005 and 0, respectively. The control unit 89 detects the minimum value and the maximum value with respect to each of the five reception dispersion compensation quantities. Three types of lines shown in FIG. 12(b) designate the maximum value, the average value and the minimum value, respectively, which are obtained through the use of the waveforms shown in FIG. 12(a). These maximum value and minimum value vary in accordance with the reception dispersion compensation quantity.

Furthermore, a description will be given hereinbelow of a method of setting a dispersion compensation quantity in consideration of both the cross phase modulation XPM and self phase modulation SPM.

Through the cooperative operations of the control unit 89 and the power detecting circuit 61d, the waveform distortion stemming from the cross phase modulation XPM is measured on each of the shortest-wavelength side and the longest-wavelength side of then channels #1 to #n. Moreover, the control unit 89 searches the optimum condition so that, of the waveform distortions measured on the shortest-wavelength side and the longest-wavelength side, the larger waveform distortion becomes smaller. Still moreover, as the waveform after transmitted, the waveform whose minimum side is closer to zero is taken preferentially.

Therefore, the power detecting circuit 61d measures a distortion (first waveform distortion) on the shortest-wavelength channel side of then wavelength channels #k and a distortion (second waveform distortion) on the longest-wavelength channel side thereof, and the control unit (dispersion compensation quantity setting unit) 89 acquires the condition for reducing the occurrence of the distortion on the shortest-wavelength channel side or the distortion on the longest-wavelength channel side measured in the power detecting circuit 61d, thereby setting a dispersion compensation quantity.

In addition, the power detecting circuit 61d measures a waveform distortion (cross phase modulation XPM) proportional to the intensity modulation of low-frequency modulated light received by the light-reception processing unit, and the control unit 89 measures the self phase modulation SPM of the modulated light, with the dispersion compensation quantity being set so that, of these waveform distortions, the larger waveform distortion is made smaller. That is, the control unit 89 serving as the dispersion compensation quantity setting unit sets the reception dispersion compensation quantity so as to reduce the quantity related to the cross phase modulation XPM, detected as a physical quantity in the power detecting circuit 61d.

In the waveforms of the reception dispersion compensation quantities shown in FIG. 12(a), the peak and bottom of the waveforms vary due to the reception dispersion compensation quantity, and of the waveforms, +300 ps/nm shows the largest intensity variation quantity, while −300 ps/nm shows the smallest intensity variation quantity. In particular, an increase in bottom value degrades the extinction ratio after the transmission and causes the transmission degradation. Moreover, it is preferable that the peak and the bottom of the waveform after transmitted are separately detected to set the reception dispersion compensation quantity at −300 ps/nm or more so as not to increase the bottom value.

Thus, each node detects both the maximum value (Max) and the minimum value (Min) of a transmitted light waveform. In this case, due to the reception dispersion compensation quantity, the maximum value and the minimum value are different from each other. Accordingly, it is preferable to select the after-transmitted waveform in which a value on the side close to the minimum value is close to 0 ps/nm.

Figure 12B:
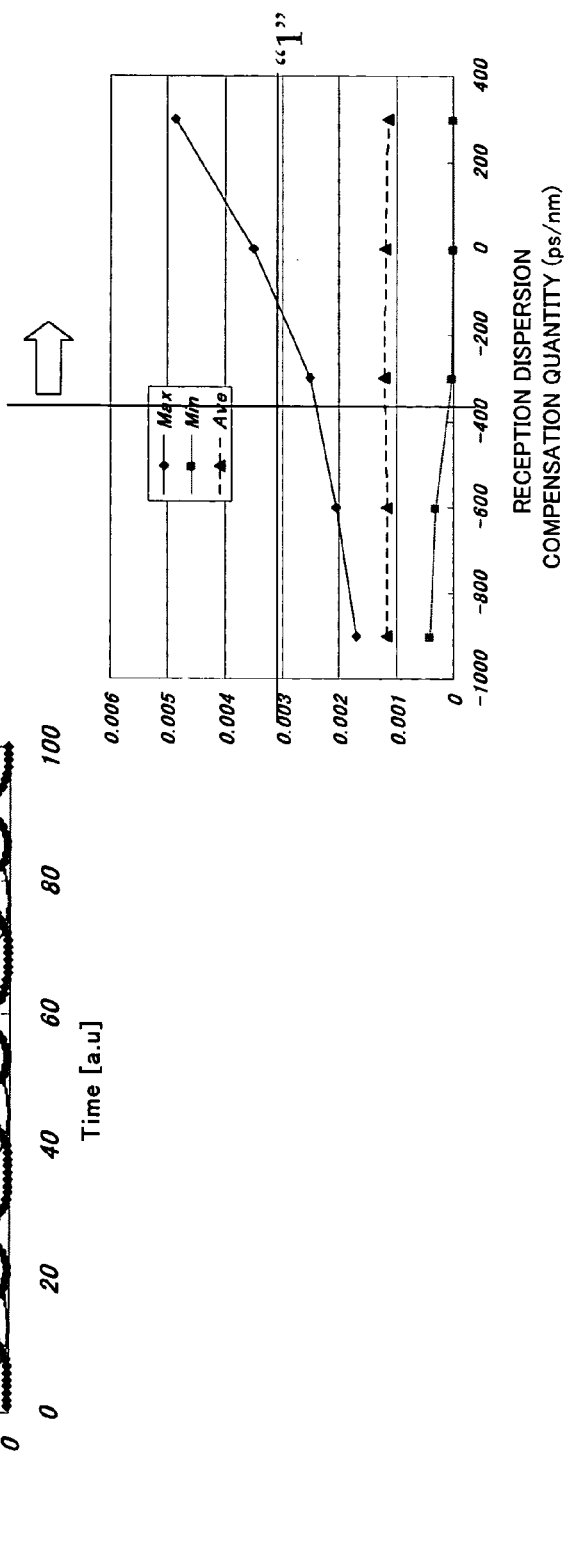
FIG. 12(b) is an illustration of the relationship between a reception dispersion compensation quantity and an intensity variation width according to the first embodiment of the present invention.

In addition, also with respect to FIGS. 12(a) and 12(b), the control unit 89 increments the reception dispersion compensation quantity from −900 (ps/nm) up to +300 (ps/nm), thereby obtaining the data shown in FIG. 12(b).

(6-4) Optimum Condition Based on Self Phase Modulation SPM Coupled with Cross Phase Modulation XPM The monitor of the effects of the waveform distortion stemming from the cross phase modulation XPM is achievable by monitoring the channel #k side received waveform to be modulated. Since there is a need to set the extinction ratio at a sufficiently high value, the transmitting terminal node 12 modulates the channel #k with an alternating pattern of "1010" corresponding to the bit rate in the WDM transmission system 100 or a sine-wave intensity modulation pattern signal. The alternating pattern or the sine-wave intensity modulation pattern signal develops the crosstalk with respect to the CW light transmitted through the channel #k adjacent to the channel #k and, simultaneously with this, the intensity modulation pattern signal itself develops a waveform due to the self phase modulation SPM.

As described above, according to this WDM transmission system 100, the dispersion compensation quantity can be set while directly evaluating the occurrence quantity of the cross phase modulation XPM, thus realizing an optimum dispersion compensation configuration whereby the effects of the cross phase modulation XPM are avoidable. Moreover, for the dispersion compensation quantity, the modulated light is monitored to separately evaluate the waveform distortion due to the self phase modulation SPM and the waveform distortion due to the cross phase modulation XPM, which leads to the enhancement of accuracy.

Therefore, a manager can set the reception dispersion compensation quantity so as to provide the least intensity variation quantity, and the need for manual operations is eliminable, which improves the transmission efficiency.

Moreover, the functions of the receiving units #1 to #n are realizable with a jig (tool, equipment) in which specified reception functions are specialized in testing, maintaining, managing, measuring and others.

(6-5) Method of Setting Residual Dispersion Quantity Between Transmitting Terminal Node 12 and Receiving Terminal Node 14

Figure 13A:
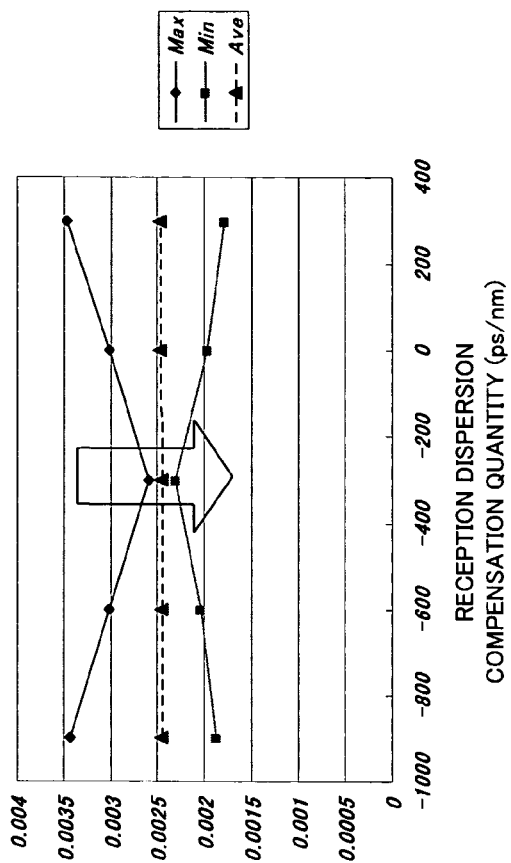
FIGS. 13(a) to 13(c) are illustrations useful for explaining a method of setting a residual dispersion value according to the first embodiment of the present invention.
Figure 13B:
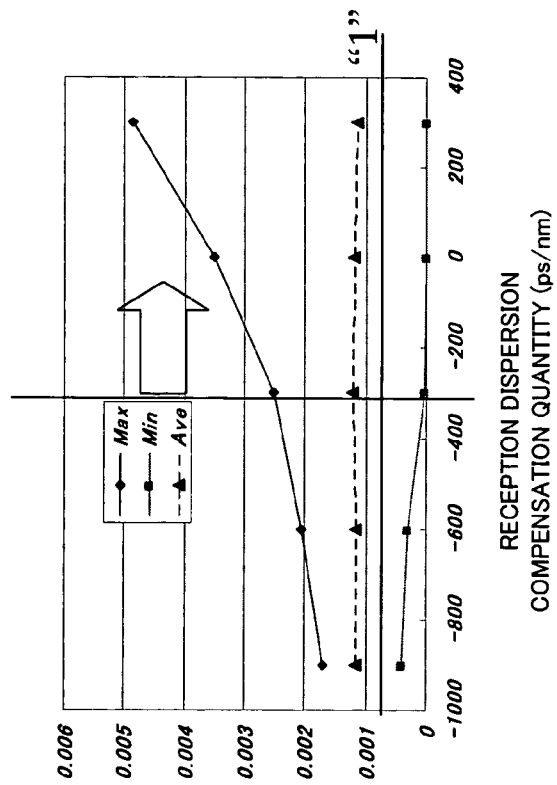
Figure 13C:
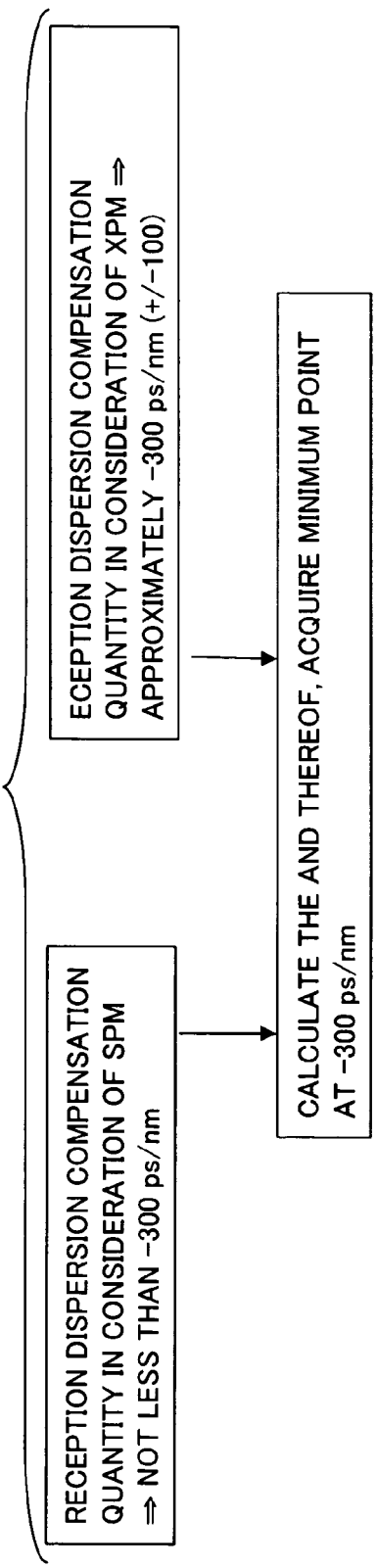

FIGS. 13(a) to 13(c) are illustrations for explaining a method of setting a residual dispersion quantity according to the first embodiment of the present invention. The reception dispersion compensation quantity shown in FIG. 13(a) is related to the self phase modulation SPM and the reception dispersion compensation quantity shown in FIG. 13(b) is related to the cross phase modulation XPM, which shows the reception dispersion compensation quantity in terms of the self phase modulation SPM and the reception dispersion compensation quantity in terms of the cross phase modulation XPM. The parameter of the reception dispersion compensation quantity is the same as that shown in FIGS. 11(a) and 11(b).

In addition, as shown in FIG. 13(a), from the viewpoint of the self phase modulation SPM, the reception dispersion compensation quantity equal to or more than −300 ps/nm becomes necessary, and from the viewpoint of the cross phase modulation XPM shown in FIG. 13(b), the reception dispersion compensation quantity closer to −300 ps/nm is preferable. Therefore, as the condition for satisfying both the self phase modulation SPM and the cross phase modulation XPM, the reception dispersion compensation quantity is set at −300 ps/nm. Accordingly, the reception dispersion compensation quantity is approximately −300 ps/nm, and the tolerance of the reception dispersion compensation quantity is +100 ps/nm to −100 ps/nm.

Thus, as shown in FIG. 13(c), for the dispersion compensator, the reception dispersion compensation quantity is determined as −300 ps/nm in consideration of the common condition on both the reception dispersion compensation quantity stemming from the self phase modulation SPM and the reception dispersion compensation quantity stemming from the cross phase modulation XPM, and the reception dispersion compensation quantity of −300 ps/nm is set therein. Therefore, instead of merely determining the minimum value of a curve as a compensation quantity, the optimum point is determined while considering both the phase modulations.

Accordingly, in this WDM transmission system 100, the power detecting circuit 61d detects a waveform distortion stemming from the cross phase modulation XPM as a physical quantity, and the control unit (dispersion compensation quantity setting unit) 89 sets the dispersion compensation quantity so that the waveform distortion detected in the power detecting circuit 61d is made smaller. That is, the effect of the cross phase modulation XPM is detected and the target value (residual dispersion target) of the dispersion quantity contained in the received light is set so as to minimize the effect of the cross phase modulation XPM.

(7) Description of Method of Calculating Self Phase Modulation SPM and Cross Phase Modulation XPM Due to the transmission, each of the n signal lights is self-phase-modulated by itself, and it is cross-phase-modulated by the other (n−1) signal lights. A detailed description will concretely be given of, as an example, the channel #1. With respect to the channel #1, due to the nonlinear optical effect of the optical fiber transmission line 50, the self phase modulation SPM occurs in accordance with an intensity variation of the channel #1 itself.

In this case, the occurrence quantity of the self phase modulation SPM is calculated through the use of the following equations (1) and (2). In the equation (1), $n_2$, $\lambda$, $A_e$ and $L_e$ denote a nonlinear refractive index, a wavelength, an effective cross section and an effective interaction length, and $P_1(t)$ depicts an input power of inputted light.

$$\text{SPM occurrence quantity } \Delta\phi n_1 = \gamma * P_1(t) * L_e \quad (1)$$

$$\text{where } \gamma = 2\pi * n_2 / (\lambda * A_e) \quad (2)$$

Moreover, the channel #1 is exposed to the cross phase modulation XPM corresponding to intensity variations of the channels #2 to #n having wavelengths different from the wavelength of the channel #1. The occurrence quantity of this cross phase modulation XPM corresponds to the phase modulation quantity due to the XPM the channel #k undergoes, and it is calculated according to the following equations (3) and (4).

$$\text{XPM occurrence quantity } \Delta\phi n_1 = 2\gamma * P_1(t) * L_e \quad (3)$$

Considering the walk-off arising from the dispersion, the equation (3) becomes as follows.

$$\Delta\phi n_1 = 2\gamma \epsilon T/(D\Delta\lambda) * P_1(t) \quad (4)$$

In the equation (4), $\epsilon T$, $D$ and $\Delta\lambda$ designate a time of variation of light intensity, a coefficient of dispersion and a channel interval, respectively.

Therefore, since both the channels #k and #m (see FIGS. 7(a) to 7(e)) are affected by the phase modulation, the optical signal transmission distance becomes longer by suppressing the dispersion and the nonlinear optical effect.

Moreover, since the phase variation quantity is in proportion to a variation of $P_1(t)$, the wavelength varies with time. This wavelength variation is equally called chirping (wavelength fluctuation), and the transmission side modulates a pulse with a linear sweep frequency with respect to its pulse width time T and transmits it, and the reception side receives the reception pulse through a filter whereby the delay time is relatively reducible at a high-frequency area.

Still moreover, when signal light passes through a dispersion medium such as an optical fiber or a dispersion compensator, the signal light is converted into a waveform variation quantity, as expressed by the following equation (5).

$$B = \Delta\phi DL/\Delta t \quad (5)$$

Thus, the waveform distortion arising from the cross phase modulation XPM depends greatly upon the dispersion quantity between a site (position on the network) where the cross phase modulation XPM occurs and the receiving terminal node 14.

In addition, the cross phase modulation XPM occurring site is in the vicinity of the input (place where the transmission line intensity is high) in each span. Considering the dispersion compensation on the downstream side of each span, when the XPM occurring in a specific span is converted into a waveform distortion, the difference between the residual dispersion quantity at the input to that span and the residual dispersion quantity after transmitted is converted into a waveform distortion. Usually, since the ILA 13a of the repeating node 13 compensates for the dispersion in each span, the compensation quantity of the reception dispersion compensator closest to the reception end of the WDM transmission system 100 has the most influence on the waveform distortion (see FIG. 2).

In other words, with respect to the amplitude variation (waveform distortion), the power detecting circuit 61d (FIG. 6) detects the cross phase modulation XPM on the basis of the difference between the input residual dispersion quantity and the output residual dispersion quantity in a specified span of the WDM transmission system 100.

In response to a change of the dispersion compensation quantity of the DCR 9b (FIG. 1 and others), the intensity modulation quantity of the signal light of the channel #k inputted through the use of CW light varies depending on the dispersion compensation quantity.

This intensity modulation quantity is for the relative comparison in magnitude of intensity, with the intensity fluctuation being monitored. Moreover, the intensity modulation quantity is a parameter of an optical signal including the degradation stemming from the dispersion and the degradation stemming from factors other than the dispersion. Incidentally, in a case in which there is a need to acquire a more accurate quantity than the intensity modulation quantity, it is also appropriate to use an intensity modulation degree as a parameter.

(8) Description of Method of Setting Reception Dispersion Compensation Quantity Before Activation With respect to the dispersion compensation quantity setting method in the above-described configuration according to the first embodiment, referring to FIG. 14. a description will be given of a dispersion compensation quantity setting operation, and referring to FIG. 15, a description will be given of a reception dispersion compensation quantity setting method.

Figure 14:
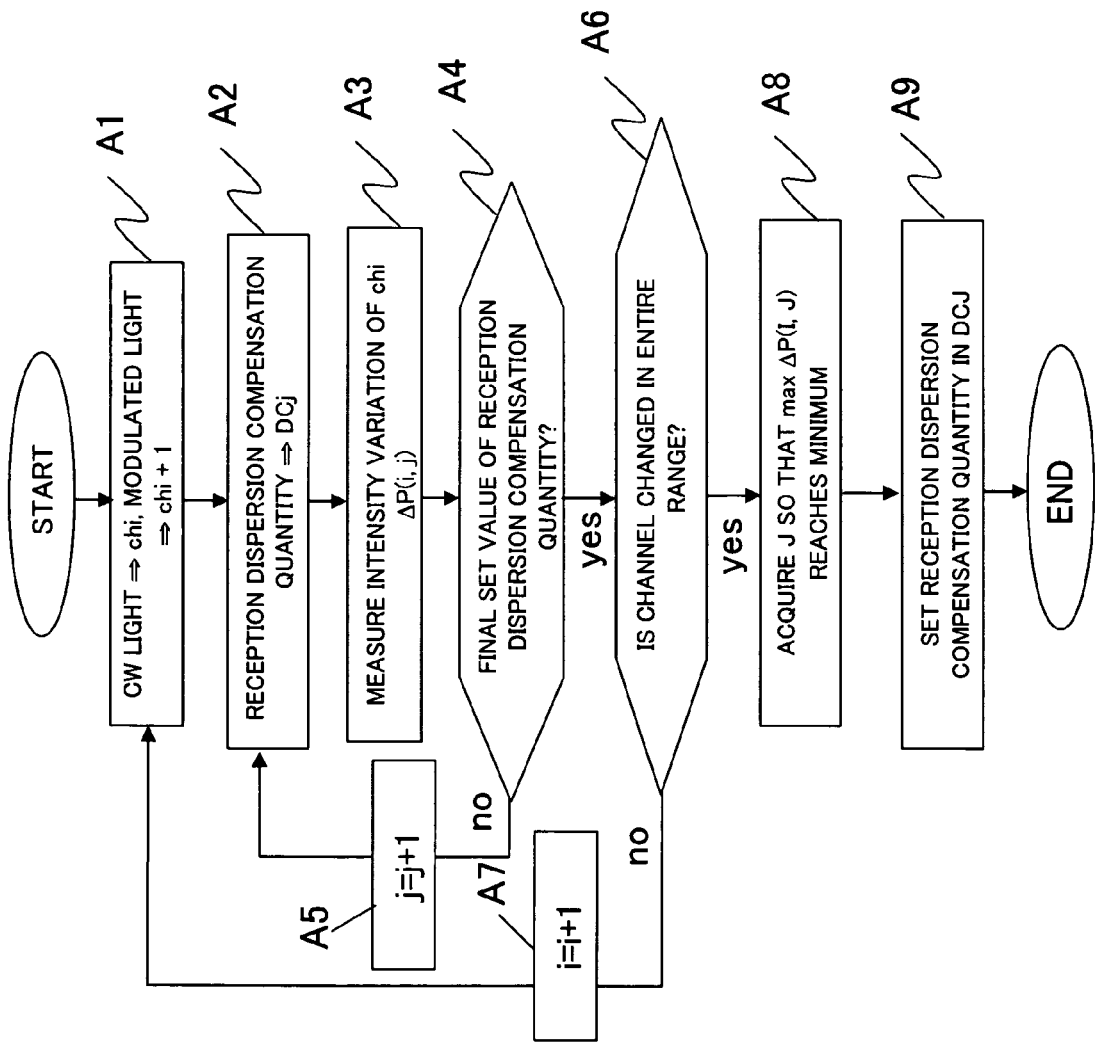
FIG. 14 is a flow chart useful for explaining a method of setting a reception dispersion compensation quantity according to the first embodiment of the present invention.

FIG. 14 is a flowchart useful for explaining a reception dispersion compensation quantity setting method according to the first embodiment of the present invention. After the activation, in a step A1, the control unit 89 of the receiving terminal node 14 sets CW light and modulated light in the channel #i (for example, channel #1) and the channel #(i+1) (for example, channel #2), where i (natural number) represents the number of channels. Moreover, the control unit 89 sets five kinds of reception dispersion compensation quantities (−900, −600, −3000, +300 ps/nm), indicated on the horizontal axes of FIGS. 11(b), 12(b), 13(a) and 13(b), for example, in a DCj (step A2), where j (natural number) represents the number of parameters of the reception dispersion compensation quantities.

Following this, in FIG. 14, the control unit 89 measures an intensity modulation quantity ΔP (i, j) of the channel #i (step A3) and, in a step A4, makes a decision as to whether or not the setting of the reception dispersion compensation quantities is made on the final value (for example, +300 ps/nm). In the case of no final value, the operational flow goes through the no route and j is incremented in a step A5, and the processing of the step A2 and subsequent steps is repeatedly conducted. On the other hand, if the answer of the step A4 indicates that the setting of the reception dispersion compensation quantities is made on the final value +300 ps/nm, the operational flow goes through the yes route and, in a step A6, the control unit 89 makes a decision as to whether the entire channel area is searched or not.

Until all the channels are changed in the step A6, the control unit 89 takes the no route and increments i in a step A7, and repeatedly carries out the processing of the step A1 and subsequent steps. In this case, i is incremented with respect to the channels #1 to #(n−1) to be used in the WDM transmission system 100. On the other hand, if the step S6 indicates the completion of the search on all the channels #1 to #(n−1), in a step A8, the control unit 89 calculates and acquires J which minimizes the intensity modulation quantity ΔP (i, j) of the longest-wavelength side channel of the plurality of channels.

Thus, the control unit 89 involves a step of changing the reception dispersion compensation quantity j in the channel #i forming any one of the n channels #1 to #n for measuring the intensity modulation quantity ΔP (i, j) of the channel #i, a step of changing the reception dispersion compensation quantity j in the channel #(i+1) different from the channel #i in the reception dispersion compensation quantity changing step for measuring the intensity modulation quantity ΔP(i+1, j) of the channel #(i+1), and a step of calculating the reception dispersion compensation quantity J so that the intensity modulation quantities ΔP measured in the above-mentioned steps reach a minimum.

Figure 15:
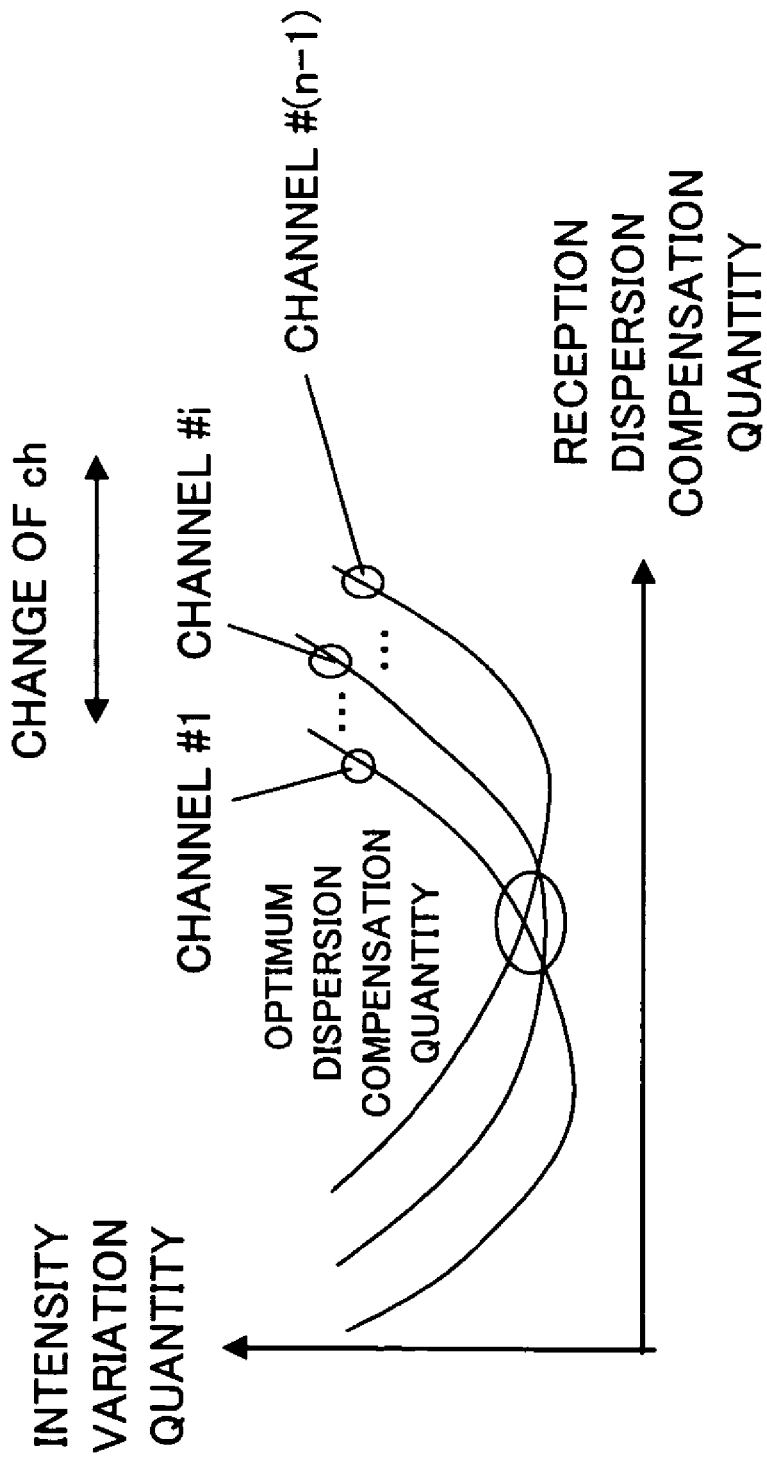
FIG. 15 is an illustration useful for explaining a method of determining a reception dispersion compensation quantity according to the first embodiment of the present invention.

Furthermore, FIG. 15 is an illustration for explaining a reception dispersion compensation quantity determining method according to the first embodiment of the present invention. With respect to three channels of all the channels #1 to #(n−1), the control unit 89 calculates curves of "reception dispersion compensation quantity"-vs.-"intensity modulation quantity" and retains the curves corresponding to the three channels and the intensity modulation quantity ΔP(i, j) for each channel. That is, the control unit 89 sets a plurality of intensity modulation quantity measuring channels (for example, three channels) and sets, in the dispersion compensator, the dispersion compensation quantity corresponding to the minimum one of the intensity modulation quantities of the three channels. That is, in the step A9 in FIG. 14, the control unit 89 sets this minimum intensity modulation quantity ΔP(i, j) as the reception dispersion compensation quantity in the DCj.

As described above, according to the present invention, the WDM transmission system 100 can cope with the characteristics in which the dispersion compensation quantity varies in accordance with wavelength, which enables setting an appropriate dispersion compensation quantity.

(9) Comparison Between Conventional Technique and the Present Invention

A comparison is made between a conventional technique and the present invention. According to the conventional technique, the compensation of the dispersion compensation quantity in the repeating node 13 is usually made for each span and, hence, difficulty is encountered in adjusting the compensation quantity largely. Moreover, the production of a dispersion map is related to, in addition to the DCR 9b, the individual compensation quantities of the dispersion compensators forming a DCT 9a and a DCL 13b of the repeating node 13, which makes it difficult to set a compensation quantity adaptively in accordance with a transmission condition. Moreover, the wavelength dispersion value of the optical fiber transmission line 50 varies with time in accordance with variations of laying environments such as temperature and pressure.

On the other hand, according to the present invention, the compensation quantity can be set on the basis of the fact that both the DCT 9a and the DCR 9b contribute greatly to a dispersion map. Concretely, in the WDM transmission system 100, a dispersion compensator for adjusting the increase or decrease in compensation quantity is adjustable. More concretely, with respect to the adjustment of the compensation quantity of the DCT 9a and the adjustment of the DCT 9a and the DCR 9b and the adjustment of the dispersion compensation quantity of the repeating node 13, the examination on the specification or site of a dispersion compensator to be compensated and others is considerably omissible and any compensating method is applicable.

In addition, by employing a DCR 9b such as an etalon type, VIPA type or FBG as the dispersion compensator, a manager can automatically set the optimum dispersion compensation quantity even after the installation of the optical fiber transmission line 50 and the repeating nodes 13, the transmitting terminal node 12 or the receiving terminal node 14.

As described above, the present invention compensates for the nonlinear distortion based on the cross phase modulation XPM in a pinpoint fashion and carries out the compensation in consideration of the cross phase modulation XPM and other degradation factors, which gives the degree of freedom to the variation width of the set value of the compensation quantity.

Moreover, by suppressing the waveform distortion, it is possible to relax the NF (Noise Figure) of the optical amplifier and the electric amplifier in design. In consequence, the restrictions on devices and parts constituting the optical amplifier and the electric amplifier can be relaxed in specification and the reduction of cost of the parts is promotable.

This not only effectively compensates for the dispersion quantity and improves the transmission quality and reliability, but also enables separately evaluating the waveform distortion stemming from the self phase modulation SPM and the waveform distortion stemming from the cross phase modulation XPM and promoting the reduction of cost of the parts, and even reduces the efforts for examination on the number of wavelengths, distance and others needed for maintaining the transmission capability or performance.

Still moreover, this optimizes the crosstalk, suppresses the output intensity of transmitted light, removes the nonlinear optical effect of the transmitted light, eliminates the need for the previous simulation, and enhances the cost performance.

(A1) First Modification

In the first embodiment, the dispersion compensation quantity is designed to be set when the WDM transmission system 100 is in a constructed state, in operation or is in a state immediately before the starting of operation.

As the first modification, a description will be given hereinbelow of the above-mentioned respective measurements being feasible even through the use of a jig (tool, equipment) in which specified reception functions are specialized in testing, maintaining, managing, measuring and others. Moreover, the jig can be simplified although the transmission processing on a main signal and the demodulation processing on the main signal are not conducted.

Incidentally, the switching of the monitor channels is also feasible with a configuration using no tunable laser diode 60b, and the monitor channel switching can also be made in a manner such that a laser diode for outputting CW light and a cross-connect unit are made in a set.

Figure 16:
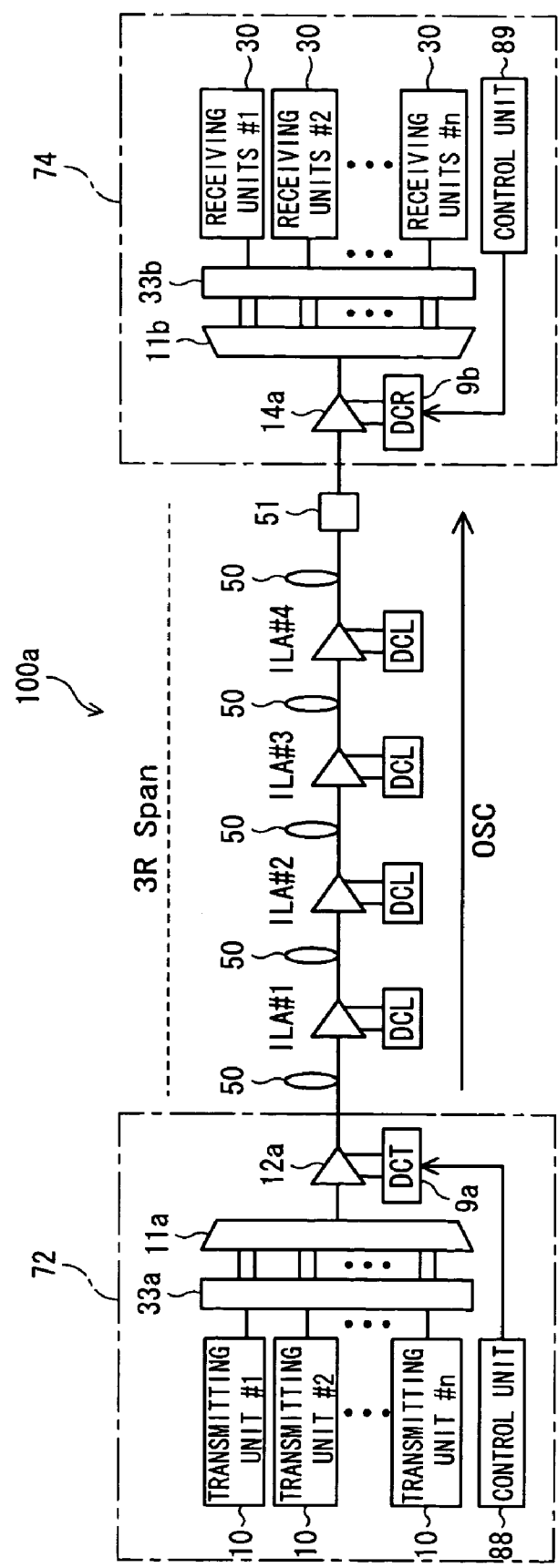
FIG. 16 is a schematic illustration of a configuration of a WDM transmission system according to a first modification of the first embodiment of the present invention.

FIG. 16 is a schematic illustration of a configuration of a WDM transmission system according to the first modification of the first embodiment of the present invention. The WDM transmission system 100a shown in FIG. 16 is designed to transmit wavelength-multiplexed signal light in which n wavelengths different from each other are multiplexed, and is made up of a transmitting terminal node 72, a receiving terminal node 74 and, for example, four repeating nodes 13. The transmitting terminal node 72 and the receiving terminal node 74 are equipped with cross-connect units 33a and 33b, respectively.

The cross-connect unit 33a is made to multiplex one or more wavelength lights of CW lights with wavelengths $\lambda_1$ to $\lambda_n$ outputted from the transmitting units #1 to #n, while the cross-connect unit 33b is made to demultiplex the received wavelength-multiplexed light into single lights with the wavelengths $\lambda_1$ to $\lambda_n$ and to output them.

One wavelength $\lambda_k$ (k represents a natural number from 1 to n) forming any one thereof is selected and outputted, or the CW lights with all the wavelengths $\lambda_1$ to $\lambda_n$ are outputted. Concretely, the cross-connect unit 33a outputs the CW light with one wavelength $\lambda_k$ in the dispersion compensation quantity setting phase, and outputs the CW lights with all the wavelengths $\lambda_1$ to $\lambda_n$ in the main signal transmission phase. In this case, as the operations of the transmitting units #2 and #4 to #n which do not output the transmission light, a manager can stop the respective operations of the transmitting units #2 and #4 to #n, or the manager makes all the transmitting units #1 to #n operate to output the transmission lights so that the cross-connection unit 33a selects a desired one of the transmitting units #1 and #2 to #n, with the transmitted light being outputted from the selected transmitting unit.

In FIG. 16, the same reference numerals as those used above designate the same components. The functions of the transmitting units #1 to #n are realizable with a jig (tool, equipment) in which specified transmission functions are specialized in testing, maintaining, managing, measuring and others. On the former-stage side of the receiving terminal node 74, the component marked with the numeral 51 is a dispersion compensating unit 51, which will be mentioned later.

Figure 17:
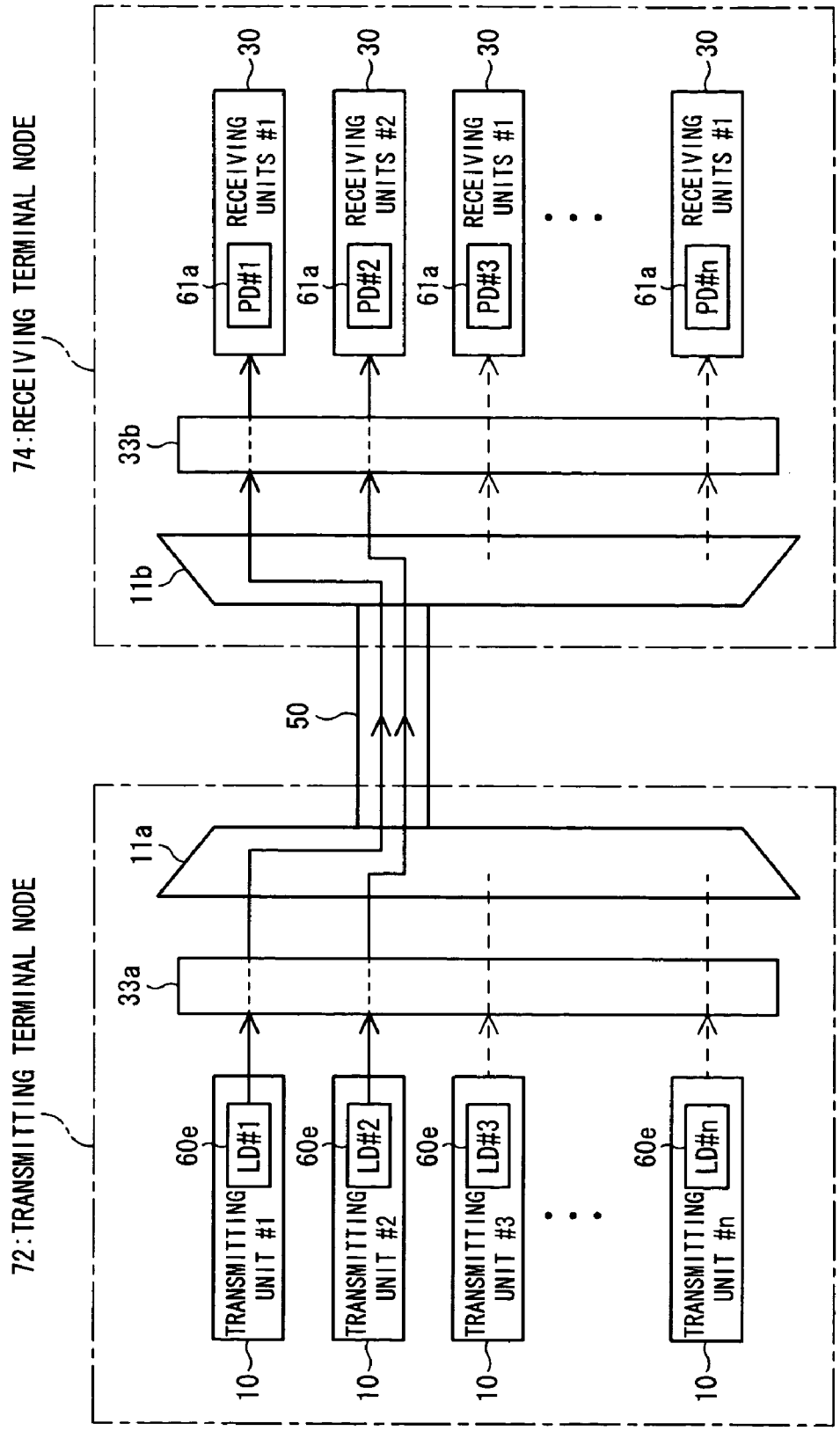
FIG. 17 is an illustration useful for explaining a cross-connect unit according to the first modification of the first embodiment of the present invention.

FIG. 17 is an illustration useful for explaining the cross-connect units 33a and 33b according to the first modification of the first embodiment of the present invention. In FIG. 17, the cross-connect unit 33a receives the CW light from the transmitting unit #1 and the modulated lights outputted from laser diodes 60e of the transmitting units #2 to #n and permits the passage of only two waves of the CW light and the modulated light to output them to the optical fiber transmission line 50. These CW light and modulated light #k are demodulated in the receiving terminal node 14 and then inputted to a photodiode #k, which receives the same channel as that of the modulated light #k, and monitored in the latter-stage (not shown) of the photodiode #k to measure a dispersion compensation quantity.

Figure 18A:
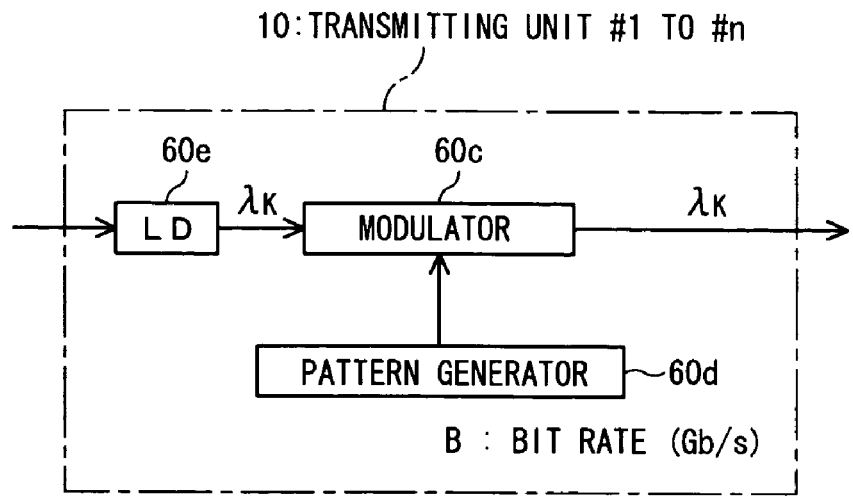
FIG. 18(a) is a block diagram showing a transmitting unit according to the first modification of the first embodiment of the present invention.
Figure 18B:
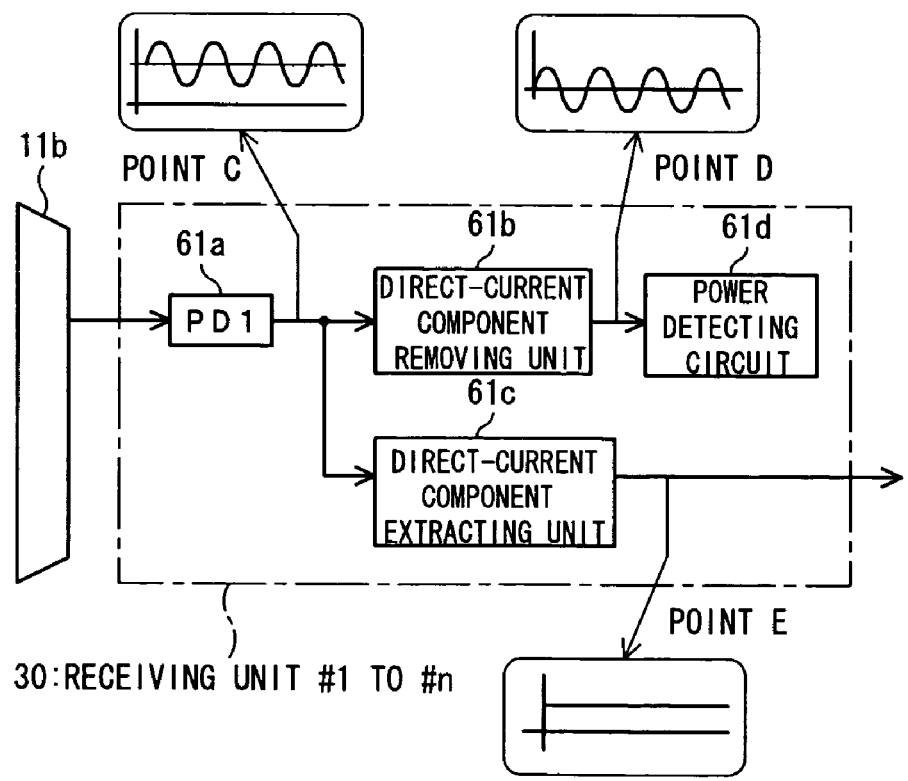
FIG. 18(b) is a block diagram showing a receiving unit according to the first modification of the first embodiment of the present invention.

FIG. 18(a) is a block diagram showing the transmitting units #1 to #n according to the first modification of the first embodiment of the present invention. The transmitting unit 10 (transmitting units #1 to #n) shown in FIG. 18(a) is composed of a laser diode (LD) 60e for generating CW light with a fixed output wavelength, a modulator 60c and a pattern generator 60d. FIG. 18(b) is a block diagram showing the receiving units #1 to #n according to the first modification of the first embodiment of the present invention. In FIGS. 18(a) and 18(b), the same reference numerals as those used above designate the same components or the same functions, and the description thereof will be omitted for brevity. The transmitting units #1 to #n and the receiving units #1 to #n have only the function to output monitor light with a fixed wavelength.

For example, when the wavelengths $\lambda_1$ and $\lambda_2$ are selected from the wavelengths $\lambda_1$ to $\lambda_n$ outputted from the transmitting units #1 to #n shown in FIG. 17, in the cross-connect unit 33a, the selected wavelengths $\lambda_1$ and $\lambda_2$ are amplified and multiplexed in the multiplexing unit 11a and the wavelength-multiplexed light of the two wavelengths is outputted to the optical fiber transmission line 50. With respect to this wavelength-multiplexed light, a phase modulation occurs in the optical fiber transmission line 50 due to the effects of both the self phase modulation SPM and the cross phase modulation XPM. This phase modulation changes into an amplitude distortion in the case of a long transmission distance, and this change applies modulation to the transmitted light so that the light intensity-modulated or amplitude-modulated is received by the receiving terminal node 14.

In addition, the channel #2 is exposed to the intensity modulation in a period of T. When the light corresponding to two channels is transmitted, with respect to the channel #1, the self phase modulation SPM occurs in proportion to the intensity variation of the channel #1 itself, and the channel #2 undergoes the cross phase modulation XPM proportional to the intensity modulation of the channel #1. Moreover, the wavelength-multiplexed light is demultiplexed into the channels #1 and #3 in the demultiplexing unit 11b of the receiving terminal node 14 so that the physical quantities are monitored with respect to both the transmitted lights of the demultiplexed channels #1 and #3.

In this way, the laser diode 60e for outputting the CW light with a fixed wavelength and the cross-connect units 33a and 33b operate in cooperation with each other in a set state, which enables the dispersion compensation without using the tunable laser diode 60b.

Moreover, in the dispersion compensation quantity setting phase, the dispersion compensation function is exhibited without inputting/outputting a main signal.

Still moreover, a high-speed and large-capacity WDM transmission becomes feasible. Yet moreover, each repeating node 13 of the trunk network amplifies the received optical signal and transmits the amplified optical signal to the next-stage repeating node 13, which enables the transmission of a large volume of information data at a high speed.

Thus, according to the present invention, even in a case in which the transmission environment differs from the condition assumed through simulations, or even when the performances of the optical fiber, the optical amplifier and others are lower than those estimated, owing to the direct evaluation of the crosstalk, it is possible to optimize the crosstalk, suppress the output intensity of transmitted light, remove the nonlinear optical effect of the transmitted light, eliminate the need for the previous simulation, considerably reduce the efforts of a manager and a designer, and provide a high cost performance.

(A2) Second Modification

With respect to the switching of the monitor channel, a manager semi-manually can also operate a jig having the function of a transmitting unit to automatically measure and set a dispersion compensation quantity.

Figure 19:
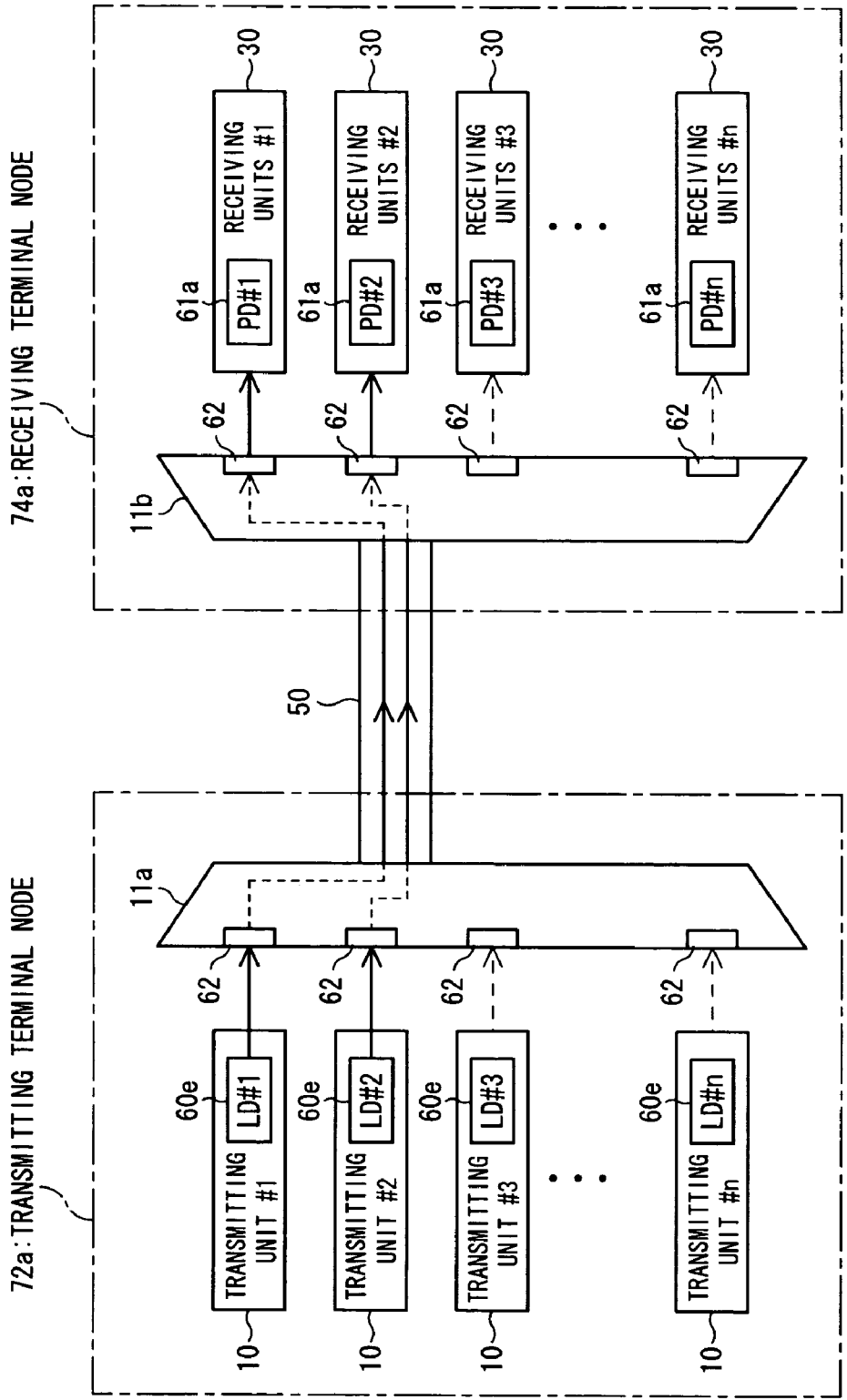
FIG. 19 is an illustration useful for explaining a channel monitor method based on a semi-automatic method according to a second modification of the first embodiment of the present invention.

FIG. 19 is an illustration useful for explaining a channel monitoring method based on a semi-automatic method according to a second modification of the first embodiment of the present invention. Terminals 62 for the attachment and detachment of a jig are formed in a multiplexing unit 11a of a transmitting terminal node 72a and in a demultiplexing unit 11b of a receiving terminal node 74a. In FIG. 19, the same reference numerals as those used above designate the same components.

In addition, a control unit (not shown) sets three intensity modulation quantity measuring channels through the use of the reception dispersion compensation quantity determining method shown in FIG. 15. The control unit (not shown) sets a dispersion compensation quantity corresponding to a smallest intensity modulation quantity in a dispersion compensator.

A manager applies an intensity modulation of a frequency $f_m$ (Hz) to the channel #1 through the use of a transmission jig and inputs CW light to the channel #2. On the other hand, the manager monitors the modulation quantity (modulation degree) of the frequency $f_m$ in the channel #2 through the use of a reception jig and determines the intensity modulation value as $I_m$ (channel #1) and retains the contents thereof.

Moreover, the manager sets the channel to be modulated at the channel #k by operating the transmission jig and sets the channel to be modulated with a CW signal at the channel #L. In this case, the channels #k and #L are channels adjacent to each other. That is, the channels #k and #L are adjacent to each other so that k−L=1 or L−k=1 holds. In this connection, in a case in which the adjacent channels are the channels #L and #k, the manager can use the modulated channel or the CW light channel, or both the modulated channel and the CW light channel.

Still moreover, another manager monitors the output variation of the channel #k set in the CW through the use of the reception jig and sets the intensity thereof as $I_m$ (channel #1). Likewise, $I_m$ is monitored with respect to several channels in a band in which the k or 1 includes the maximum channel m. The condition that the maximum value of $I_m$ becomes at a minimum is searched by changing the reception side DCM quantity and a reception side DCM quantity is set.

That is, the manager connects the laser diode #1, which outputs the transmitted light of the channel #1, to the terminal 62 of the multiplexing unit 11a, and another manager sets a photodiode for the channel #1 in the multiplexing unit 11a. Moreover, after the completion of the monitor on the channel #1, the manager detaches the LD #1 and connects the LD #2 to the terminal 62 of the multiplexing unit 11a. Still moreover, also on the reception side, the other manager changes the photodiode to automatically set a dispersion compensation quantity with respect to the channel #2. Thereafter, the connection and the detachment are repeated. This enables the dispersion compensation with high accuracy.

Thus, before or after the activation of the WDM transmission system 100, similarly to the reception dispersion compensation quantity, the manager carries out the measurements on a plurality of channels which are the maximum and minimum wavelengths of the wavelength range (wavelength band) to be used for the transmission and an intermediate wavelength provided as needed. This enables an optimum compensation value to be set as the dispersion compensation quantity through the use of the measured dispersion quantity.

Therefore, the manager can use a reception dispersion compensator so that the intensity variation quantity becomes at a minimum, which leads to eliminating the need for the manual operations and improving the transmission efficiency.

Moreover, as in the case of the employment of the cross-connect units 33a and 33b, the dispersion compensation quantity for the channel #1 is set in the receiving terminal node 14 before the activation.

(A3) Third Modification

It is also appropriate that only the dispersion compensation function is provided at a position, in a node or in a unit different from each node (transmitting terminal node 12, receiving terminal node 14, and four repeating nodes 13) and others in the WDM transmission system. As one example, a dispersion compensating unit 51 (FIG. 16) is provided in the optical fiber transmission line 50 lying on the former-stage side of the receiving terminal node 74. Moreover, this dispersion compensating unit 51 is equipped with the aforesaid power detecting circuit 61d and control unit (dispersion compensation quantity setting unit) 89, and for determining the dispersion quantity compensation distribution, the same dispersion compensation quantity setting method as that shown in FIGS. 10 to 15 is used, thus carrying out an appropriate dispersion compensation.

Therefore, a WDM transmission system (not shown) according to the third modification is made up of a node (first transmitting station) for transmitting CW light (constant-intensity light) and intensity-modulated light (modulated light) having a wavelength different from that of the CW light and a node (second transmitting station) for detecting a physical quantity arising from an amplitude variation of the CW light transmitted from the first-mentioned node to set a reception dispersion compensation quantity on the basis of the physical quantity.

Furthermore, in this configuration, the transmitting terminal node 12 (first station) shown in FIG. 16 transmits non-modulated light and modulated light obtained by the modulation using a modulation pattern signal such as a monitor signal (transmission step). In this case, the non-modulated light is continuous-wave light, and the modulation pattern signal is a one modulation pattern signal or a plurality of modulation pattern signals different in wavelength from each other, as shown in FIGS. 4(a) to 4(g).

Subsequently, the dispersion compensating unit (second station) 51 detects a physical quantity stemming from the cross phase modulation XPM between the transmitting terminal node 12 and the dispersion compensating unit 51 on the basis of a variation (variation quantity) of each of the intensity of the non-modulated light and the intensity of the modulated light transmitted in the transmission step (detection step), and the dispersion compensating unit 51 sets a dispersion compensation quantity on the basis of a variation of the physical quantity detected in the detection step (dispersion compensation quantity setting step).

In addition to the effects of the first embodiment, this enables a fine dispersion compensation.

(B) Description of Second Embodiment of the Present Invention

Each node (transmitting terminal node 12, receiving terminal node 14 and repeating node 13) can transmit wavelength-multiplexed light bidirectionally and can compensate for the dispersion bidirectionally. In the second embodiment, each of the transmitting terminal node 12 and the receiving terminal nod 14 is equipped with a reception dispersion compensator (DCR) and a transmission dispersion compensator (DCT).

Figure 20:
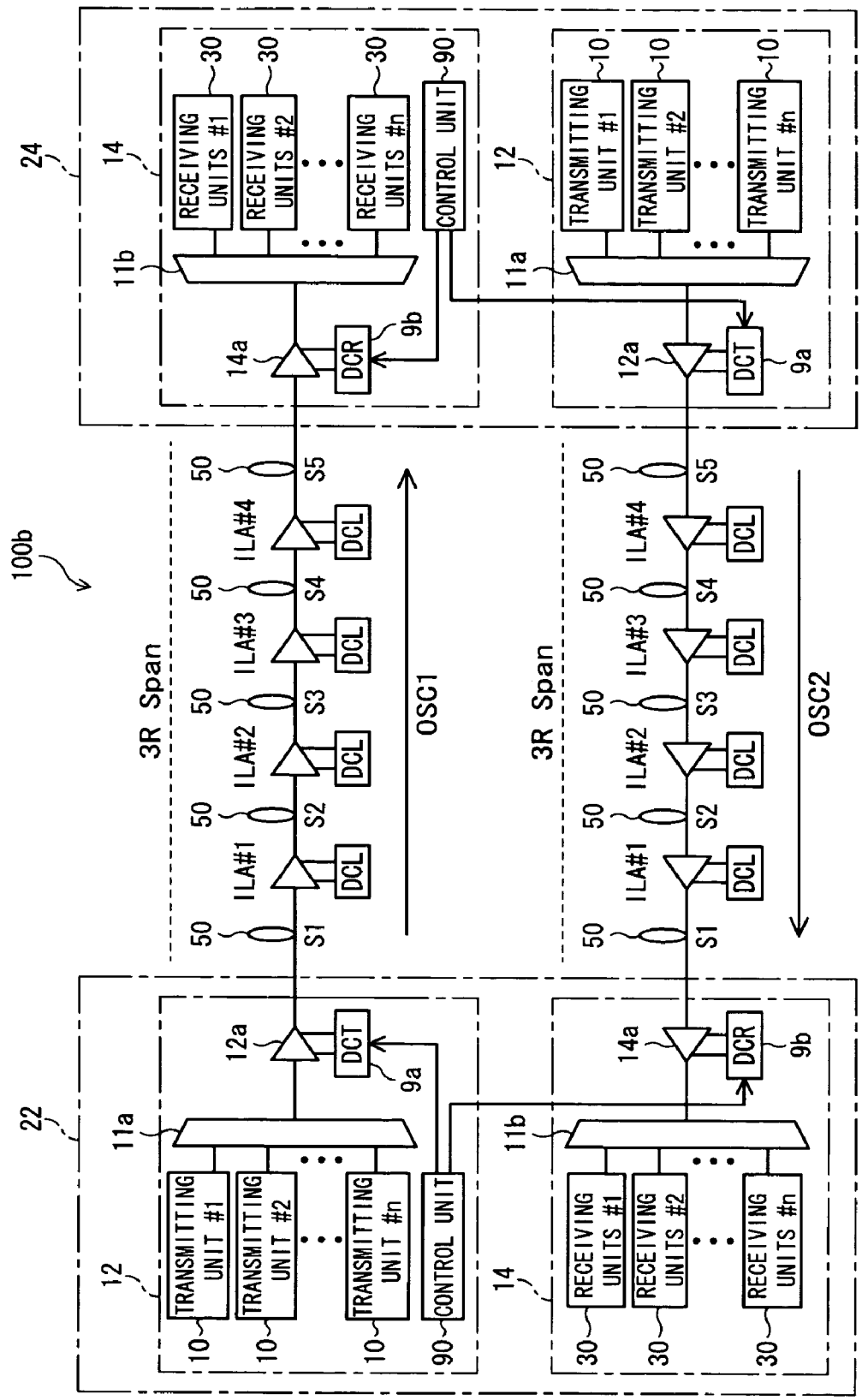
FIG. 20 is a schematic illustration of a configuration of a WDM transmission system according to a second embodiment of the present invention.

FIG. 20 is a schematic illustration of a configuration of a WDM transmission system according to the second embodiment of the present invention. The WDM transmission system 100b shown in FIG. 20 is designed to transmit wavelength-multiplexed light bidirectionally, and it is made up of a transmitting/receiving terminal node (transmitting/receiving terminal station) 22, a transmitting/receiving terminal node (transmitting/receiving terminal station) 24 and, for example, four repeating nodes 13, and optical fiber transmission lines 50 are provided in a direction (which will hereinafter be referred to as a "down direction") from the transmitting/receiving terminal node 22 to the transmitting/receiving terminal node 24 and in the opposite direction (which will hereinafter be referred to as an "up direction").

As the transmission routes of the up direction and the down direction, both the same routes and different routes are available. That is, in the case of the use of the same routes, the up-direction monitor light is transmitted to the transmitting/receiving terminal node 24 through the same ILA #1 to #4 as the ILA #1 to #4 through which the down-direction transmitted light passes. On the other hand, in the case of the use of the different routes, the up-direction monitor light can also be transmitted through the repeating nodes 13 and others different from the ILA #1 to #4 through which the down-direction transmitted light passes.

The transmitting/receiving terminal node 22 shown in FIG. 20 is composed of n (n represents the number of multiplexes) transmitting units 10, a multiplexing unit 11a, an EDFA 12a, a DCT 9a, n receiving units 30, a demultiplexing unit 11b, a DCR 9b and a control unit 90.

In this configuration, the control unit 90 is for setting a dispersion compensation quantity for each of the DCT 9a and the DCR 9b on the basis of a variation of a physical quantity detected in a power detecting circuit of the receiving unit 30, and functions as a dispersion compensation quantity setting unit. Moreover, the control unit 90 includes a detecting unit and a dispersion compensation quantity setting unit (not shown), and detects an intensity fluctuation of the CW light detected in the receiving unit 30 and a modulated component extracted from the modulated light to calculate a reception dispersion compensation quantity on the basis of variations of the intensity fluctuation and the modulated component. Therefore, the setting of the dispersion compensation quantity in the second embodiment is made by the dispersion compensators not only in the reception side but also in the transmission side. In FIG. 20, the same reference numerals as those used above designate the same parts.

Figure 21:
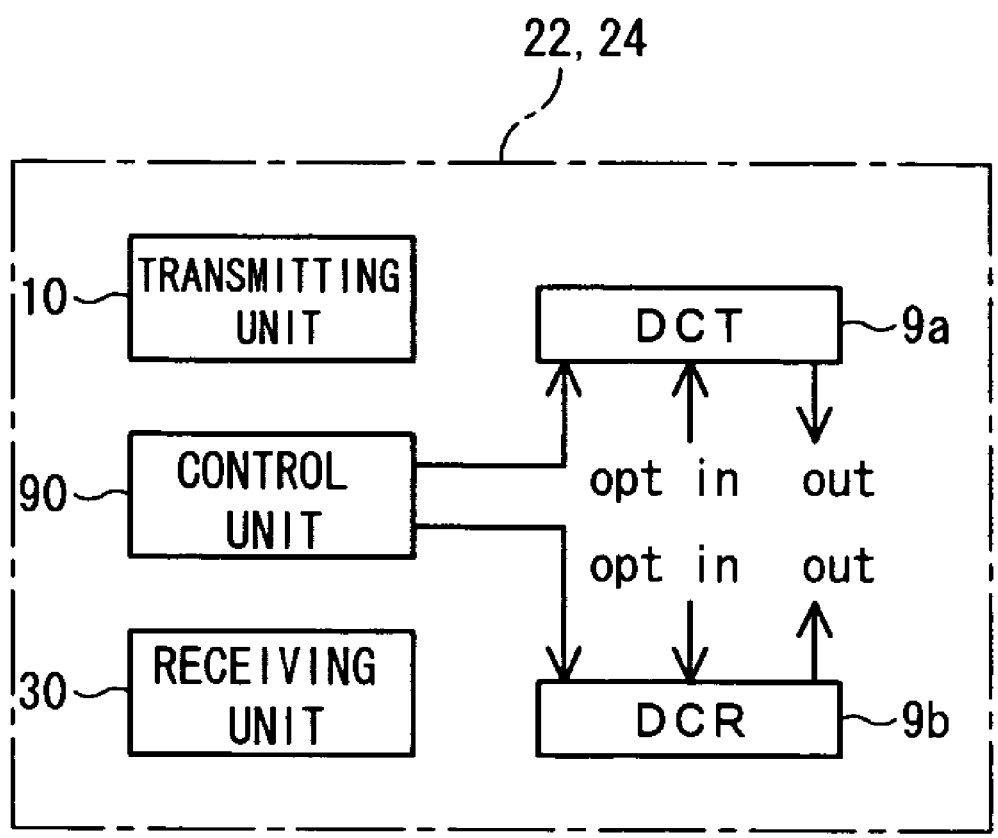
FIG. 21 is an illustration useful for explaining an operation of a control unit according to the second embodiment of the present invention.

FIG. 21 is an illustration useful for explaining an operation of the control unit 90 according to the second embodiment of the present invention.

Both the monitor channel switching functions of the transmitting/receiving terminal nodes 22 and 24 are realized using a control signal (for example, opt in or the like) from a tunable laser diode (not shown). Moreover, the DCT 9a and DCR 9b are a variable dispersion compensator, and an appropriate dispersion compensation quantity can be set therein.

The transmitting/receiving terminal node 24 has the same configuration as that of the transmitting/receiving terminal node 22, and the description of the transmitting/receiving terminal node 24 will be omitted for avoiding repeated explanation.

Referring to FIGS. 20 and 21, a description will be given hereinbelow of a method of setting a variable dispersion compensator.

The control unit 90 shown in FIG. 20 sets a transmission dispersion compensation value of the DCT 9a at an initial value and notifies the fact of the setting thereof through the down-direction OSC 1 to the control unit 90 of the transmitting/receiving terminal node 24. The control unit 90 of the transmitting/receiving terminal node 24 sets a reception dispersion compensation value of the DCR 9b at an initial value.

The receiving unit 30 of the transmitting/receiving terminal node 24 measures an intensity modulation degree and a waveform distortion stemming from the self phase modulation SPM and inputs the measurement results to the control unit 90. This measurement is continuously made in a desired environment. When the measurement in that environmental condition reaches completion, the control unit 90 updates the compensation value of the DCR 9b and makes the same measurement as that before the updating of the compensation value to acquire data on a predetermined compensation value.

In addition, when the measurement of a predetermined measurement item(s) reaches completion, the transmitting unit 10 of the transmitting/receiving terminal node 24 notifies the compensation value (or data indicative of the compensation value) of the DCR 9b through the OSC 2 to the control unit 90 of the transmitting/receiving terminal node 22. The control unit 90 of the transmitting/receiving terminal node 22 changes the set value of the DCT 9a on the basis of the compensation value transmitted from the transmitting/receiving terminal node 24, and again notifies the after-changed compensation value to the control unit 90 of the transmitting/receiving terminal node 24.

By repeating these setting and notification, the transmitting/receiving terminal nodes 22 and 24 acquire an appropriate combination of the compensation values of the DCT 9a and DCR 9b, and set this compensation value in the DCT 9a and DCR 9b.

Moreover, the acquisition of the appropriate value is conducted through the calculation in the control unit 90 of the transmitting/receiving terminal node 24.

The appropriate dispersion compensation quantity in the down direction is attainable in this way. On the other hand, the operation for the up direction (direction from the transmitting/receiving terminal node 24 to the transmitting/receiving terminal node 22) is conducted similarly to the setting method in the down-direction.

Still moreover, before the activation of the WDM transmission system 100b (dispersion compensation quantity setting phase), the transmitting/receiving terminal node 22 outputs the CW light (or low-frequency modulated light) of the channel #1 through the use of the transmitting unit #1 and outputs the modulated light of the channel #3, which is obtained by applying an intensity modulation to the CW light in a period T, through the use of the transmitting unit #3. Moreover, in the optical fiber transmission line 50, with respect to the channel #1, the self phase modulation SPM occurs, and with respect to the channel #2, the cross phase modulation XPM proportional to the intensity modulation of the channel #1 occurs. The transmitting/receiving terminal node 24 carries out the same dispersion compensation quantity processing as that according to the first embodiment to set a dispersion compensation quantity so that the target value of the residual dispersion between the terminal nodes reaches a minimum.

In addition, the transmitting/receiving terminal node 24 also outputs the CW light (or low-frequency modulated light) of the channel #1 and the modulated light of the channel #3, obtained by the intensity modulation of the period T with respect to the CW light, to the transmitting/receiving terminal node 22. Still additionally, the transmitting/receiving terminal node 22 conducts the same dispersion compensation quantity processing as that of the first embodiment to set a dispersion compensation quantity. Incidentally, each of the transmitting unit #2 and the transmitting units #4 to #n does not transmit the transmitted light.

On the other hand, in the main signal transmission phase after the activation of the WDM transmission system 100b, each of the transmitting/receiving terminal nodes 22 and 24 outputs the transmitted light from the transmitting units #1 to #n.

Thus, the occurrence quantity of the transmission degradation is directly evaluated to set a dispersion compensation quantity appropriately, and the effect of the cross phase modulation XPM is minimized.

In addition, the monitor channel switching functions can also be displayed with a laser diode (not shown) for outputting CW light with a fixed wavelength and a cross-connect unit being placed into a set condition. Alternatively, it is also acceptable that, whenever the monitor on each channel reaches completion, a manager replaces a laser diode in a transmission side node with a laser diode for a separate channel and further employs a separate photodiode as a photodiode in a reception side node.

Figure 23A:
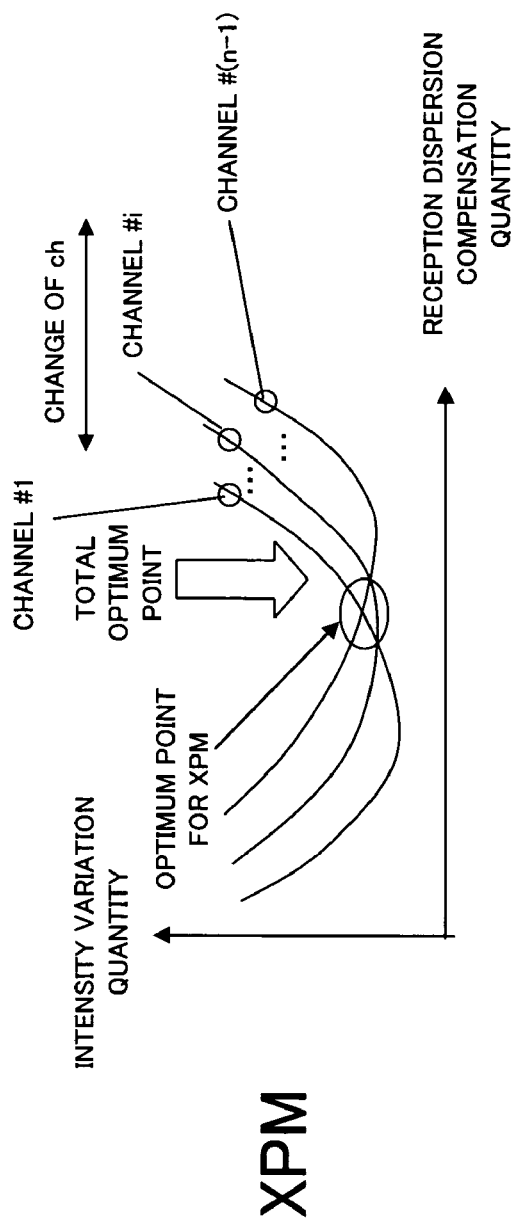
FIG. 23(a) is an illustration useful for explaining a reception dispersion compensation quantity determining method about a cross phase modulation XPM according to the second embodiment of the present invention.
Figure 23B:
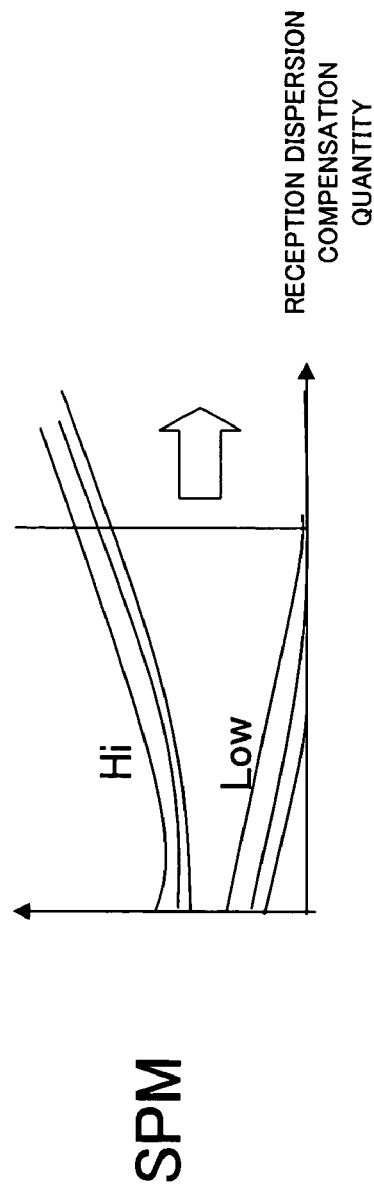
FIG. 23(b) is an illustration useful for explaining a reception dispersion compensation quantity determining method about a self phase modulation SPM according to the second embodiment of the present invention.

Referring to FIGS. 22, 23(a) and 23(b), a description will be given hereinbelow of a dispersion compensation quantity setting method according to the second embodiment in the above-described configuration.

FIG. 22 is an flow chart useful for explaining a reception dispersion compensation quantity setting method according to the second embodiment of the present invention. After the activation, the control unit 90 sets CW light and modulated light in the channels #i and #(i+1) in a step B1, where each of i, and j represents a natural number. In this connection, after the activation, with respect to the first dispersion compensation quantity, the CW light and the modulated light are set in the channels #1 and #2, respectively. Moreover, the control unit 90 sets the reception dispersion compensation quantity in the DCj (step B2).

Following this, the control unit 90 measures the intensity modulation quantity $\Delta P(i, j)$ of the channel #i (step B3), and measures a peak value $\Delta Pp(i, j)$ of the received waveform and a bottom value $\Delta Pb(i, j)$ thereof in a step B4. Moreover, in a step B5, the control unit 90 makes a decision as to where or not the reception dispersion compensation value is set as a final value. If it is not the final value, the operational flow goes through the no route to increment j in a step B6 for again repeatedly conducting the processing of the step B2 and subsequent steps.

When the answer of the step B5 shows that the setting of the reception dispersion compensation quantity is made on the final value, the operational flow goes through the yes route, and in a step B7, the control unit 90 makes a decision as to whether or not the search on all the channels #1 to #(n−1) reaches completion. Until the step B7 shows the change of all the channels #1 to #(n−1), the control unit 90 increments i in a step B8 and repeatedly conducts the processing of the step B1 and subsequent steps. On the other hand, if the answer of the step B7 shows the change of all the channels #1 to #(n−1), the operational flow passes through the yes route to conduct the processing in a step B9.

In this step B9, the control unit 90 acquires J so that the intensity modulation quantity $\Delta P(i, j)$ of the longest-wavelength side channel reaches a minimum. Moreover, the control unit 90 acquires J so that Pb (i, j) becomes below a threshold Pth, and calculates a J value satisfying both the cross phase modulation XPM and the self phase modulation SPM, or a J value closest to the satisfaction thereof.

In addition, in a step B10, the control unit 90 sets a reception dispersion compensation quantity in the DCj as shown in FIGS. 23(a) and 23(b).

As described above, before the activation of the WDM transmission system 100b, similarly to the reception dispersion compensation quantity, the manager carries out the measurements on a plurality of channels which are the maximum and minimum wavelengths of the wavelength range (wavelength band) to be used for the transmission and an intermediate wavelength provided as needed.

Furthermore, referring to FIGS. 23(a) and 23(b), a more detailed description will be given hereinbelow of the processing in the step B9.

FIG. 23(a) is an illustration useful for explaining a reception dispersion compensation quantity determining method for the cross phase modulation XPM according to the second embodiment of the present invention, and FIG. 23(b) is an illustration useful for explaining a reception dispersion compensation quantity determining method for the self phase modulation SPM according to the second embodiment of the present invention.

The control unit 90 compensates for the dispersion with respect to the cross phase modulation XPM shown in FIG. 23(a) and compensates for the dispersion with respect to the self phase modulation SPM shown in FIG. 23(b). Concretely, the control unit 90 calculates "reception dispersion quantity"-vs.-"intensity modulation quantity" curves on three types of channels of all the channels #1 to #n and retains the curve corresponding to each of the channels and the intensity modulation quantity $\Delta P(i,j)$ of each channel. Moreover, the control unit 90 sets the minimum intensity modulation quantity $\Delta P(i,j)$ as the reception dispersion compensation quantity in the DCj.

As described above, the second embodiment can also directly evaluate an occurrence quantity of the cross phase modulation XPM, set a dispersion compensation quantity, and realize an optimum dispersion compensation configuration for avoiding the cross phase modulation XPM. Moreover, this WDM transmission system 100b can acquire an appropriate dispersion compensation quantity in accordance with a wavelength.

In addition, through the monitoring of modulated light, this enables separately evaluating a waveform distortion originating from the self phase modulation SPM and a waveform distortion originating from the cross phase modulation XPM.

Still additionally, a manager can maintain the transmission capability or performance, such as an increase in wavelengths of wavelength-multiplexed light and the shortening of distance.

Thus, in addition to the effects of the first embodiment, the second embodiment of the present invention can improve the transmission quality and reliability, separately evaluate the waveform distortions stemming from the self phase modulation SPM and the cross phase modulation XPM, and facilitate the reduction of cost of parts.

(C) Others

It should be understood that the present invention is not limited to the above-described embodiments, and that it is intended to cover all changes and modifications of the embodiments of the invention herein which do not constitute departures from the spirit and scope of the invention.

For example, the WDM transmission systems 100, 100a and 100b can be constructed in a state where an optical add/drop multiplexing system is connected thereto. This optical add/drop multiplexing system is a network system provided in the middle of the optical fiber transmission line 50 between the transmitting terminal node 12 and the receiving terminal node 14 to carry out the add/drop of transmitted light.

In addition, the WDM transmission system 100 can also be connected to a subscriber network system.

A dispersion compensation quantity can be set while directly evaluating the occurrence quantity of the cross phase modulation XPM, which realizes an optimum dispersion compensation configuration for avoiding the effects of the cross phase modulation XPM.

Moreover, the monitoring of modulated light enables separately evaluating a waveform distortion originating from the self phase modulation SPM and a waveform distortion originating from the cross phase modulation XPM, which considerably reduces the setting work burdens before the activation of the WDM transmission system.

What is claimed is:

1. A dispersion compensation quantity setting method for use in a wavelength-multiplexing optical transmission system including a transmitting terminal station and a receiving terminal station and made to transmit wavelength-multiplexed light, said method comprising:

a transmission step in which the transmitting terminal station transmits continuous-wave light and modulated light obtained by modulation using a modulation pattern signal, wherein the modulated light is a wavelength different from a wavelength of said continuous-wave light;

a detection step in which said receiving terminal station detects a physical quantity of a variation in intensity of said continuous-wave light transmitted in said transmission step, wherein the physical quantity corresponds to an amount of cross phase modulation being incurred by said continuous-wave light; and a dispersion compensation quantity setting step in which said receiving terminal station sets a reception dispersion compensation quantity on the basis of a variation of said physical quantity detected in said detection step.

2. The dispersion compensation quantity setting method according to claim 1, wherein, in said detection step, a quantity related to cross phase modulation of said modulated light occurring between said transmitting terminal station and said receiving terminal station due to an amplitude variation of said continuous-wave light is detected as said physical quantity.

3. The dispersion compensation quantity setting method according to claim 1, wherein said dispersion compensation quantity setting step comprising:

a measurement step in which said receiving terminal station varies a dispersion compensation quantity of a dispersion compensator provided in said receiving terminal station to measure a physical quantity arising from an amplitude variation for each of a plurality of reception dispersion compensation quantities; and a minimum dispersion compensation quantity setting step in which said receiving terminal station sets, in said dispersion compensator, said reception dispersion compensation quantity corresponding to a minimum physical quantity of the plurality of physical quantities measured in said measurement step.

4. The dispersion compensation quantity setting method according to claim 1, wherein, in said transmission step, said transmitting terminal station transmits, as said modulation pattern signal, modulated light obtained by modulation using an alternating pattern signal or a pseudo noise pattern signal.

5. The dispersion compensation quantity setting method according to claim 1, wherein, in said transmission step, said transmitting terminal station transmits low-frequency modulated light obtained by modulating said continuous-wave light with a low-frequency modulation signal.

6. A dispersion compensation quantity setting method for use in a wavelength-multiplexing optical transmission system including a transmitting terminal station and a receiving terminal station and made to transmit wavelength-multiplexed light, said method comprising:
- a transmission step in which said transmitting terminal station transmits constant-intensity light and intensity-modulated light having a wavelength different from a wavelength of said constant-intensity light;
- a detection step in which said receiving terminal station detects a physical quantity arising from an amplitude variation of said constant-intensity light transmitted in said transmission step, wherein the physical quantity corresponds to an amount of cross phase modulation being incurred by said constant-intensity light; and
- a dispersion quantity setting step in which said receiving terminal station sets a reception dispersion compensation quantity on the basis of said physical quantity detected in said detection step.

7. A receiving terminal station for use in a wavelength-multiplexing optical transmission system including a transmitting terminal station and said receiving terminal station and made to transmit wavelength-multiplexed light, said receiving terminal station comprising:
- a light-reception processing unit for conducting light-reception processing on constant-intensity light and intensity-modulated light having a wavelength different from a wavelength of said constant-intensity light, transmitted from said transmitting terminal station;
- a detecting unit for detecting a physical quantity arising from an amplitude variation of said constant-intensity light of said constant-intensity light and said intensity-modulated light received in said light-reception processing unit; wherein the amplitude variation corresponds to an amount of cross phase modulation being incurred by said constant-intensity light; and
- a dispersion compensation quantity setting unit for setting a reception dispersion compensation quantity on the basis of said physical quantity detected in said detecting unit.

8. The receiving terminal station according to claim 7, wherein said dispersion compensation quantity setting unit sets said reception dispersion compensation quantity so that a quantity related to cross phase modulation and detected as said physical quantity in said detecting unit is made smaller.

9. The receiving terminal station according to claim 7, wherein, with respect to said amplitude variation, said detecting unit detects a cross phase modulation on the basis of a difference between an input residual dispersion quantity and an output residual dispersion quantity in a specified span of said wavelength-multiplexing optical transmission system.

10. The receiving terminal station according to claim 9, wherein a dispersion compensator in which said reception dispersion compensation quantity is set is provided to compensate for dispersion of received light, and said dispersion compensation quantity setting unit sets, in said dispersion compensator, said reception dispersion compensation quantity corresponding to a minimum physical quantity of a plurality of physical quantities arising from said amplitude variation measured for each of a plurality of reception dispersion compensation quantities.

11. The receiving terminal station according to claim 7, wherein, with respect to amplitude variation of low-frequency modulated light obtained by modulating said constant-intensity light, received in said light-reception processing unit, with a low-frequency modulation signal, said detecting unit detects independently an amplitude variation arising from self phase modulation of said modulated light occurring in proportion to an intensity variation of said low-frequency modulated light itself and an amplitude variation arising from cross phase modulation of said low-frequency modulated light occurring in proportion to an intensity modulation of said low-frequency modulated light.

12. A wavelength-multiplexing optical transmission system for transmitting wavelength-multiplexed light, comprising:
- a transmitting terminal station for transmitting constant-intensity light and intensity-modulated light having a wavelength different from a wavelength of said constant-intensity light; and
- a receiving terminal station for detecting a physical quantity arising from an amplitude variation of said constant-intensity light transmitted from said transmitting terminal station to set a reception dispersion compensation quantity on the basis of the detected physical quantity, wherein the detected physical quantity corresponds to an amount of cross phase modulation being incurred by said constant-intensity light.

13. The wavelength-multiplexing optical transmission system according to claim 12, further comprising an in-line amplifier provided between said transmitting terminal station and said receiving terminal station for detecting a physical quantity arising from an amplitude variation of said constant-intensity light transmitted from said transmitting terminal station to set a reception dispersion compensation quantity on the basis of the detected physical quantity.

14. A wavelength-multiplexing optical transmission system for transmitting wavelength-multiplexed light, comprising:
- a first transmitting station for transmitting constant-intensity light and intensity-modulated light having a wavelength different from a wavelength of said constant-intensity light; and
- a second transmitting station for detecting a physical quantity arising from an amplitude variation of said constant-intensity light transmitted from said first transmitting station to set a reception dispersion compensation quantity on the basis of the detected physical quantity, wherein the detected physical quantity corresponds to an amount of cross phase modulation being incurred by said constant-intensity light.

15. A method comprising:
- transmitting a constant-intensity light and intensity-modulated light having a wavelength different from a wavelength of the constant-intensity light;
- receiving the transmitted constant-intensity light and the transmitted intensity-modulated light;
- detecting a physical quantity arising from an amplitude variant of the constant-intensity light, wherein the detected physical quantity corresponds to an amount of cross phase modulation being incurred by the constant-intensity light due to transmitting the constant-intensity light and the intensity-modulated light;
- setting a reception dispersion compensation quantity on the basis of the detected physical quantity.

* * * * *